United States Patent
Ramasubramonian et al.

(10) Patent No.: US 12,003,768 B2
(45) Date of Patent: Jun. 4, 2024

(54) RESIDUAL CODING FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Luong Pham Van, San Diego, CA (US); Bappaditya Ray, San Diego, CA (US); Louis Joseph Kerofsky, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/657,867

(22) Filed: Apr. 4, 2022

(65) Prior Publication Data
US 2022/0321913 A1 Oct. 6, 2022

Related U.S. Application Data

(60) Provisional application No. 63/170,999, filed on Apr. 5, 2021.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS

2019/0087979 A1\* 3/2019 Mammou ............ H04N 19/597
2020/0099942 A1\* 3/2020 Tourapis .............. H04N 19/176
(Continued)

OTHER PUBLICATIONS

"G-PCC Codec Description", 132. MPEG Meeting, Oct. 12, 2020-Oct. 16, 2020, Online, (Motion Picture Expert Group or ISO/IEC JTC1/SC29/WG11), No. n19620, Dec. 31, 2020 (Dec. 31, 2020), 148 Pages, XP030291393, Retrieved from the Internet: URL: https://dms.mpeg.expert/doc_end_user/documents/132_OnLine/wg11/MDS19620_WG07_N00011.zip, N00011.docx [retrieved on Dec. 31, 2020].

(Continued)

*Primary Examiner* — Chikaodili E Anyikire
(74) *Attorney, Agent, or Firm* — QUALCOMM Incorporated; Espartaco Diaz Hidalgo

(57) ABSTRACT

A method of decoding point cloud data comprises obtaining a bitstream that is encoded to comply with one or more constraints and decoding the bitstream, wherein decoding the bitstream comprises: determining a residual value of a first component of an attribute of a point; generating a predicted value of a second component of the attribute of the point; and reconstructing the second component as a sum of the predicted value of the second component and a multiplication product of a scale factor for the second component and the residual value of the first component, wherein the constraints include a constraint that limits the first component of the attribute of the point, the residual value of the first component of the attribute of the point, the second component of the attribute, and the residual value of the second component of the attribute of the point to one or more predefined bitdepths.

19 Claims, 9 Drawing Sheets

(51) Int. Cl.
    *H04N 19/124*    (2014.01)
    *H04N 19/136*    (2014.01)
    *H04N 19/156*    (2014.01)
    *H04N 19/184*    (2014.01)
    *H04N 19/30*    (2014.01)

(52) U.S. Cl.
    CPC ......... *H04N 19/136* (2014.11); *H04N 19/156* (2014.11); *H04N 19/184* (2014.11); *H04N 19/30* (2014.11)

(56) References Cited

U.S. PATENT DOCUMENTS

| | | | |
|---|---|---|---|
| 2020/0105024 A1* | 4/2020 | Mammou | H04N 19/597 |
| 2020/0302655 A1* | 9/2020 | Oh | G06T 9/001 |
| 2021/0029187 A1* | 1/2021 | Oh | H04L 65/61 |
| 2021/0104072 A1* | 4/2021 | Yea | G06T 9/001 |
| 2021/0203989 A1* | 7/2021 | Wang | H04N 19/172 |
| 2021/0258590 A1* | 8/2021 | Boyce | H04N 19/182 |
| 2022/0050816 A1* | 2/2022 | Zhang | G06T 9/001 |
| 2022/0292730 A1* | 9/2022 | Gao | G06T 9/007 |
| 2022/0321913 A1* | 10/2022 | Ramasubramonian | G06T 9/001 |

OTHER PUBLICATIONS

"G-PCC Future Enhancements", 130, MPEG Meeting, Apr. 20, 2020-Apr. 24, 2020, ALPBACH, (Motion Picture Expert Group or ISO/IEC JTC1/SC29/WG11), No. n19328, Jul. 21, 2020, XP030289574, 140 Pages.

International Search Report and Written Opinion—PCT/US2022/071535—ISA/EPO—dated Jul. 11, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Park Y (LGE)., et al., "[G-PCC] [New Proposal] Clipping Real Value RGB", 132. MPEG Meeting, Oct. 12, 2020-Oct. 16, 2020, Online, (Motion Picture Expert Group or ISO/IEC JTC1/SC29/WG11), No. m55498, Oct. 13, 2020 (Oct. 13, 2020), 3 Pages, XP030292069, Retrieved from the Internet: URL: https://dms.mpeg.expert/doc_end_user/documents/132_OnLine/wg11/m55498-v1-m55498.zip, m55498/[G-PCC] [new proposal] Clipping real value RGB_v3.docx [retrieved on Oct. 13, 2020].

Ramasubramonian A.K., et al., "[G-PCC] [New Proposal] on Attribute QP Derivation", 131. MPEG Meeting, Jun. 29, 2020-Jul. 3, 2020, Online, (Motion Picture Expert Group or ISO/IEC JTC1/SC29/WG11), No. m54698, Jun. 24, 2020 (Jun. 24, 2020), 3 pages, XP030289268, Retrieved from the Internet: URL: http://phenix.int-evry.fr/mpeg/doc_end_user/documents/131_OnLine/wg11/m54698-v1-m54698.zip, m54698.docx [retrieved on Jun. 24, 2020].

Ray B (Qualcomm)., et al., "[G-PCC][New] Attribute Related High Level Syntax—Fixes and Improvements", 130. MPEG Meeting, Apr. 20, 2020-Apr. 24, 2020, Alpbach, AT, International Organisation for Standardisation Organisation Internationale De Normalisation ISO/IEC JTC1/SC29/WG11 Coding of Moving Pictures and Audio, ISO/IEC JTC1/SC29/WG11 MPEG2020/M53652 (Motion Picture Expert Group or ISO/IEC JTC1/SC29/WG11), No. m53652, Apr. 15, 2020 (Apr. 15, 2020), 17 Pages, XP030287312, [retrieved on Apr. 15, 2020].

Ray B (Qualcomm)., et al., "[G-PCC][New] on Inter-Component Residual Prediction", 132, MPEG Meeting, Oct. 12, 2020-Oct. 16, 2020, Online, (Motion Picture Expert Group or ISO/IEC JTC1/SC29/WG11), No. M55373, Oct. 7, 2020, XP030292897, 2 Pages.

Xiu (Interdigital) X., et al., "CE9-Related: Complexity Reduction and Bit-Width Control for Bi-Directional Optical Flow (BIO)", 12. JVET Meeting, Oct. 3, 2018-Oct. 12, 2018, MACAO, (The Joint Video Exploration Team of ISO/IEC JTC1/SC29/WG11 and ITU-T SG.16), No. JVET-L0256-V2, Oct. 8, 2018 (Oct. 8, 2018), XP030251694, pp. 1-15, Retrieved from the Internet: URL:http://phenix.int-evry.fr/jvet/doc_end_user/documents/12_Macao/wg11/JVET-L0256-v3.zip. JVET-L0256-r2.docx [retrieved on Oct. 8, 2018] paragraph [03.3].

Xiu (Kwai) X., et al., "CE9-Related: on BDOF Precision Alignment for High Internal Bit-depth", 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0609, m48748, Jun. 27, 2019 (Jun. 27, 2019), 4 Pages, XP030220034, Retrieved from the Internet: URL: http://phenix.int-evry.fr/jvet/doc_end_user/documents/15_Gothenburg/wg11/JVET-O0609-v2.zip, JVET-00609-r1.docx [retrieved on Jun. 27, 2019].

Xiu (Kwai) X., et al., "Non-CE4: on BDOF and PROF Parameter Derivation", 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0653, m50675, Oct. 5, 2019 (Oct. 5, 2019), 6 Pages, XP030217933, Retrieved from the Internet: URL: http://phenix.int-evry.fr/jvet/doc_end_user/documents/16_Geneva/wg11/JVET-P0653-v2.zip, JVET-P0653/JVET-P0653_r1.docx [retrieved on Oct. 5, 2019].

"Text of ISO/IEC CD 23090-9 Geometry-Based Point Cloud Compression", 126. MPEG Meeting, Mar. 25, 2019-Mar. 29, 2019, Geneva, (Motion Picture Expert Group or ISO/IEC JTC1/SC29/WG11), No. n18478, Jul. 2, 2019 (Jul. 2, 2019), XP030222353, 102 Pages, Retrieved from the Internet: URL:http:/phenix.int-evry.fr/mpeg/doc_end_user/documents/126_Geneva/wg11/w18478.zip w18478 GPCC_CD.docx [retrieved on Jul. 2, 2019].

* cited by examiner

RESIDUAL CODING FOR GEOMETRY POINT CLOUD COMPRESSION

This application claims the benefit of U.S. Provisional Patent Application 63/170,999, filed Apr. 5, 2021, the entire content of which is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for point cloud compression. As described herein, an encoder may encode a bitstream that complies with one or more constraints. During the encoding and decoding processes, last component residual prediction (LCRP) may be used to reduce the amount of encoded data associated with signaling components of attributes of points of point cloud data. As part of performing LCRP, an encoder or decoder may determine a residual value of a first component of an attribute of a point of the point cloud data. Additionally, the encoder or decoder may generate a predicted value of a second component of the attribute of the point. The encoder or decoder may reconstruct the second component as a sum of the predicted value of the second component and a multiplication product of a scale factor for the second component and the residual value of the first component. The one or more constraints may include a constraint that limits at least one of the first component of the attribute of the point, the residual value of the first component of the attribute of the point, the second component of the attribute, or the residual value of the second component of the attribute of the point to one or more predefined bitdepths. The inclusion of this constraint may reduce or eliminate the possibility of an overflow condition occurring. Such an overflow condition may reduce the quality of reconstructed point cloud data.

In one example, this disclosure describes a method of decoding point cloud data, the method comprising: obtaining a bitstream that is encoded to comply with one or more constraints; and decoding the bitstream, wherein decoding the bitstream comprises: determining, based on data signaled in the bitstream, a residual value of a first component of an attribute of a point of the point cloud data; generating a predicted value of a second component of the attribute of the point; and reconstructing the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

In another example, this disclosure describes a method of encoding point cloud data, the method comprising: obtaining the point cloud data; and encoding the point cloud data, wherein encoding the point cloud data comprises generating a bitstream that complies with one or more constraints, wherein generating the bitstream comprises: determining a residual value of a first component of an attribute of a point; generating a predicted value of a second component of the attribute of the point; and reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

In another example, this disclosure describes a device comprising: a memory configured to store point cloud data; and one or more processors coupled to the memory and implemented in circuitry, the one or more processors configured to: obtain a bitstream that is encoded to comply with one or more constraints; and decode the bitstream, wherein the one or more processors are configured to, as part of decoding the bitstream: determine, based on data signaled in the bitstream, a residual value of a first component of an attribute of a point of the point cloud data; generate a predicted value of a second component of the attribute of the point; and reconstruct the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

In another example, this disclosure describes a device comprising: a memory configured to store point cloud data; and one or more processors coupled to the memory and implemented in circuitry, the one or more processors configured to encode the point cloud data, wherein the one or more processors are configured to, as part of encoding the point cloud data, generate a bitstream that complies with one or more constraints, wherein the one or more processors are configured to, as part of generating the bitstream: determine a residual value of a first component of an attribute of a point; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

In another example, this disclosure describes means for obtaining a bitstream that is encoded to comply with one or more constraints; and means for decoding the bitstream, wherein the means for decoding the bitstream comprises: means for determining, based on data signaled in the bitstream, a residual value of a first component of an attribute of a point of point cloud data; means for generating a predicted value of a second component of the attribute of the point; and means for reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

In another example, this disclosure describes a non-transitory computer-readable data storage medium having stored thereon instructions that, when executed, cause one or more processors to: obtain a bitstream that is encoded to comply with one or more constraints; and decode the bitstream, wherein the instructions that cause the one or more processors to decode the bitstream comprise instructions that, when executed, cause the one or more processors to: determine, based on data signaled in the bitstream, a residual value of a first component of an attribute of a point of point cloud data; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

The details of one or more examples are set forth in the accompanying drawings and the description below. Other features, objects, and advantages will be apparent from the description, drawings, and claims.

DETAILED DESCRIPTION

Figure 1:
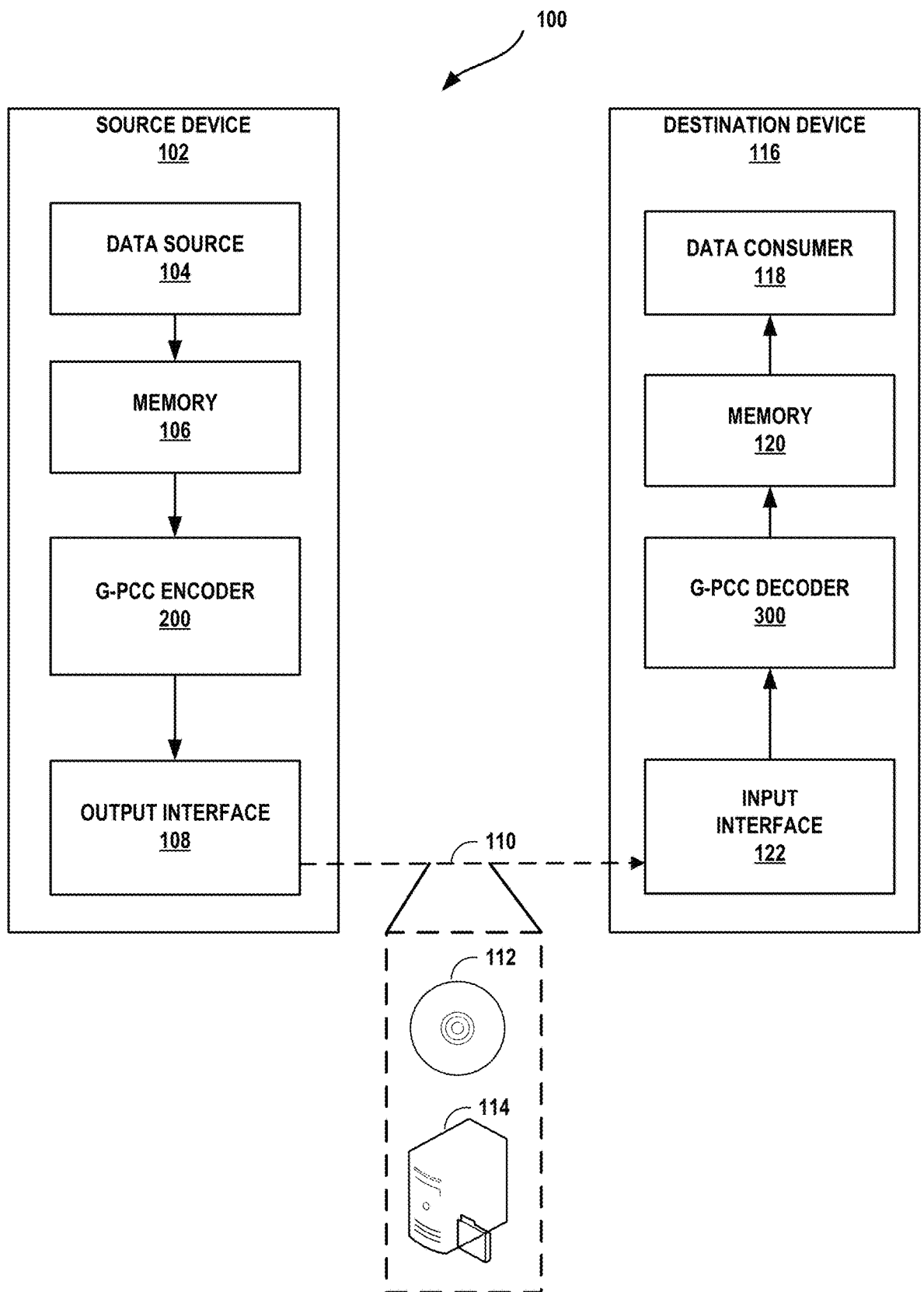
FIG. 1 is a block diagram illustrating an example encoding and decoding system that may perform the techniques of this disclosure.

Points in point clouds may have one or more attributes. Attributes of a point may include one or more components. For example, the components of a color attribute of a point may include color samples, such as red, green, and blue color samples. In another example, the components of a color attribute of a point may include a luma sample and two chroma samples. One of the color samples may be designated as a primary component and the other colors samples are designated as secondary components. For instance, the luma sample may be the primary component and the two chroma samples may be secondary components. Points may have attributes aside from or instead of color attributes.

A Geometry Point Cloud Compression (G-PCC) encoder may encode the attributes of the points in a point cloud to generate an attribute bitstream. Encoding the attributes of the points in the point cloud may reduce the amount of data required to express the attributes. A G-PCC decoder may use the attribute bitstream to reconstruct the attributes of the points in the point cloud.

In some instances, the G-PCC encoder may use inter-component residual prediction (ICRP) during the process of encoding the attributes of points in the point cloud. When the G-PCC encoder uses ICRP, the G-PCC generates a predicted value of a primary component of an attribute of a point and determines a residual value for the primary component of the attribute of the point as a difference between the primary component of the attribute of the point and the predicted value of the primary component of the point. Additionally, the G-PCC encoder generates a predicted value for a secondary component of the attribute of the point and determines an ICRP scale factor applicable to the point. The G-PCC encoder may generate a residual value of the secondary component of the attribute of the point by subtracting the predicted value of the secondary component from the value of the secondary component, and then further subtracting a multiplication product of the ICRP scale factor applicable to the point and the residual value for the primary component. The G-PCC encoder may include data based on the residual value of the primary component and the residual value of the secondary component in the attribute bitstream. The G-PCC decoder may reconstruct the value of the secondary component of the attribute of the point by adding the residual value of the secondary component, the predicted value of the secondary component, and a multiplication product of the ICRP scale factor and the residual value for the primary component. The G-PCC encoder and G-PCC decoder may generate residual values for each secondary component of the attribute of the point in the same manner.

In some instances, the G-PCC encoder may use last component residual prediction (LCRP) during the process of encoding the attributes of the points in the point cloud. LCRP is similar in some respects to ICRP, but only applies to a last secondary component of an attribute of a point of the point cloud. When the G-PCC encoder uses LCRP, the G-PCC encoder may generate a residual value for a last component of an attribute of a point based on multiplying a residual value of a penultimate component of the attribute by a LCRP scale value. The G-PCC encoder may include data based on the residual value of the last component in the attribute bitstream. The G-PCC decoder may reconstruct the value of the last component of the attribute of the point by adding the residual value of the last component and a predicted value for the last component.

When the G-PCC decoder uses either ICRP or LCRP, the G-PCC decoder performs an addition operation. Because ICRP and LCRP involve addition and multiplication operations, it is possible for a value resulting from the addition and multiplication operations to be greater than a maximum value (or less than a minimum value) that can be represented using the number of bits available for storing the resulting value. In other words, there may be an overflow condition in which there are not enough available bits to store the resulting value. For instance, there may be 32 bits available for storing the resulting value, but 33 bits may be required to store the resulting value. This may lead to errors, such as incorrect colors or other attributes being associated with points in the point cloud.

In accordance with one or more techniques of this disclosure, the G-PCC encoder may encode the attribute bitstream such that the attribute bitstream conforms to one or more constraints. With respect to ICRP, the one or more constraints limit the values of the secondary component to a range in which reconstructing the secondary component does not give rise to an overflow condition. With respect to LCRP, the one or more constraints limit the value of the penultimate component to a range in which reconstructing the last component does not give rise to an overflow condition.

Thus, in one example involving LCRP, the G-PCC encoder may obtain point cloud data and encode the point cloud data. Encoding the point cloud data includes generating a bitstream that complies with one or more constraints. As part of generating the bitstream, the G-PCC encoder may determine a residual value of a first component (e.g., a penultimate component) of an attribute of a point. Additionally, the G-PCC encoder may generate a predicted value of a second component (e.g., the last component) of the attribute of the point. The G-PCC encoder may reconstruct the second component as a sum of the predicted value of the second component and a multiplication product of a scale factor for the second component and the residual value of the first component. In this example, the one or more constraints include a constraint that limits at least one of the first component of the attribute of the point, the residual value of the first component of the attribute of the point, the second component of the attribute, or the residual value of the second component of the attribute of the point to one or more predefined bitdepths. Because the constraint limits the first component, residual value of the to the predefined bitdepth, the overflow condition discussed above may be avoided.

Similarly, a G-PCC decoder may obtain a bitstream that is encoded to comply with one or more constraints. The G-PCC decoder may decode the bitstream. As part of decoding the bitstream, the G-PCC decoder may determine, based on data signaled in the bitstream, a residual value of a first component of an attribute of a point of the point cloud data. Additionally, the G-PCC decoder may generate a predicted value of a second component of the attribute of the point. The G-PCC decoder may reconstruct the second component as a sum of the predicted value of the second component and a multiplication product of a scale factor for the second component and the residual value of the first component. In this example, the one or more constraints include a constraint that limits at least one of the second component (e.g., secondary component) of the attribute of the point, the residual value of the second component of the attribute of the point, or the residual value of the first component (e.g., primary component) of the attribute of the point to one or more predefined bitdepths. Because the constraint limits the second component, residual value of the second component, or residual value of the first component to the predefined bitdepths, the overflow condition discussed above may be avoided.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to residual coding for geometry point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to residual coding for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in ISO/IEC FDIS 23090-9, Geometry-based Point Cloud Compression, ISO/IEC JTC1/SC29/WG 7 MDS 19617, teleconference, October 2020, and a description of the codec is available in G-PCC Codec Description, ISO/IEC JTC 1/SC29/WG 7 MDS19620, Teleconference, October 2020.

Point cloud data contains a set of points in a 3D space and may have attributes associated with the points. The attributes may be color information such as R, G, B or Y, Cb, Cr, or reflectance information, or other attributes. Point cloud data may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
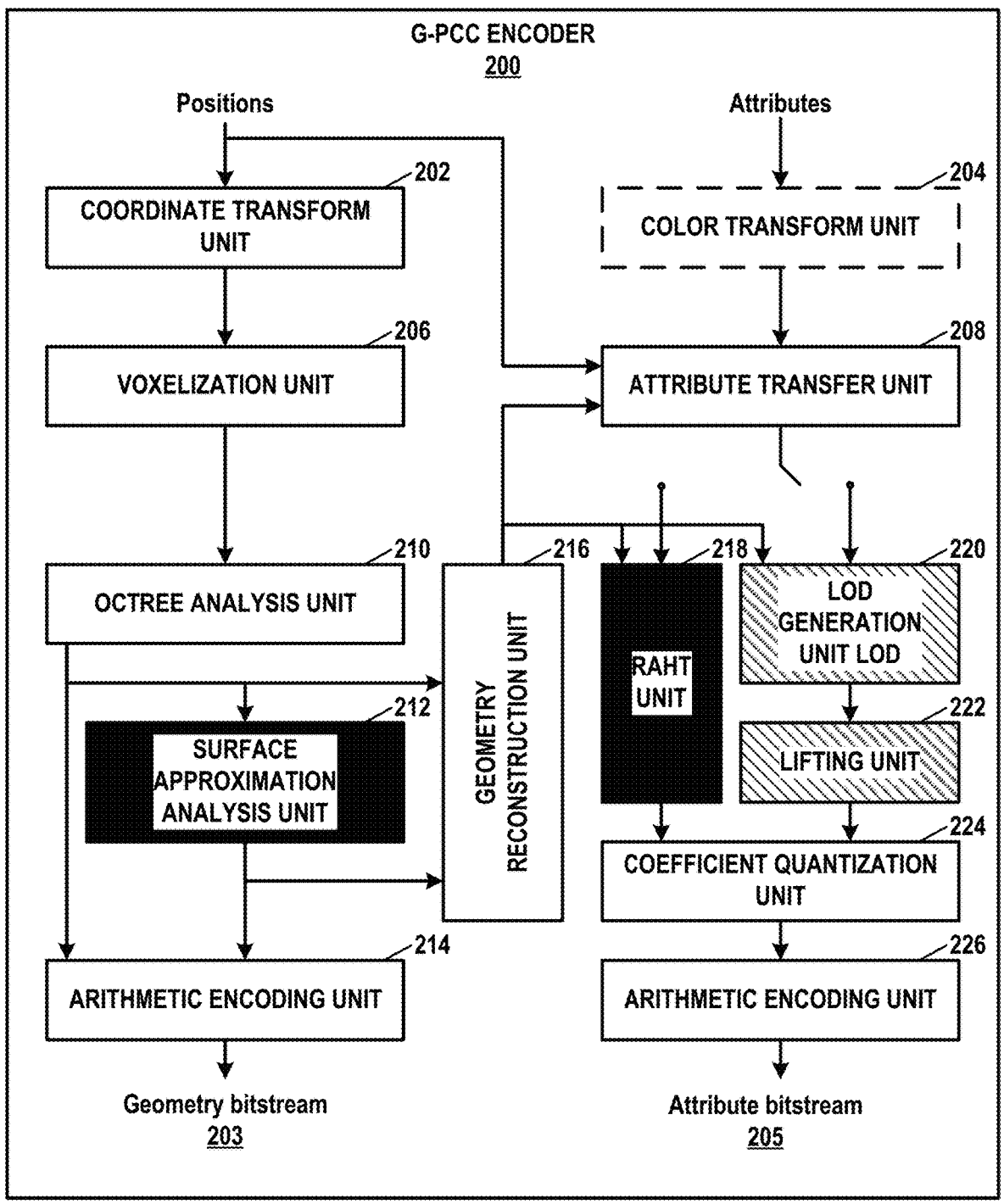
FIG. 2 is a block diagram illustrating an example Geometry Point Cloud Compression (G-PCC) encoder.
Figure 3:
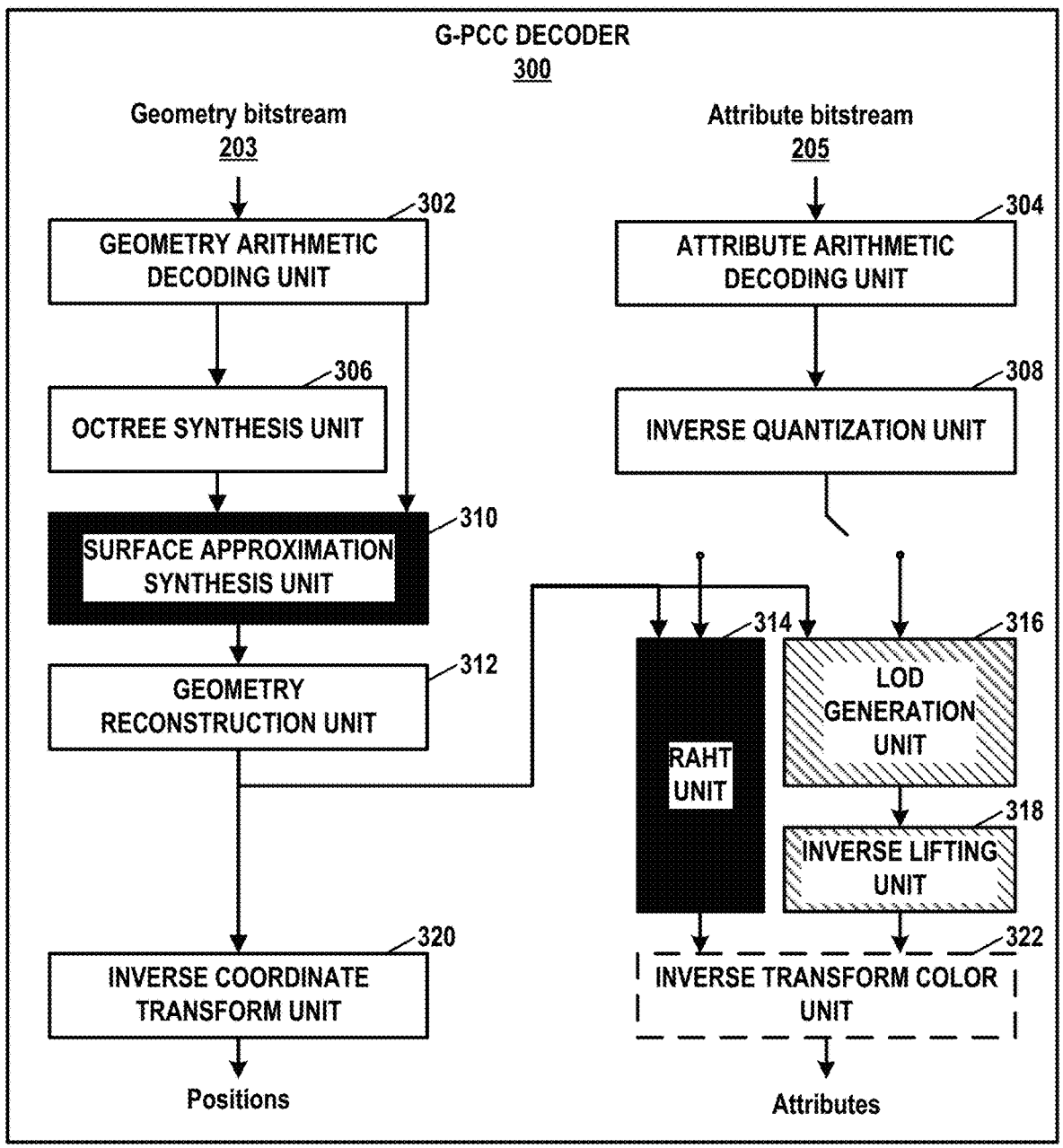
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For geometry, two different types of coding techniques exist: Octree and predictive-tree coding. The following description focuses on the octree coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned tree. In this way, both Category 1 and 3 data share the octree coding mechanism, while Category 1 data may in addition approximate the voxels within each leaf with a surface model (known as trisoup coding). The surface model used is a triangulation comprising 1-10 triangles per block, resulting in a triangle soup.

Figure 4:
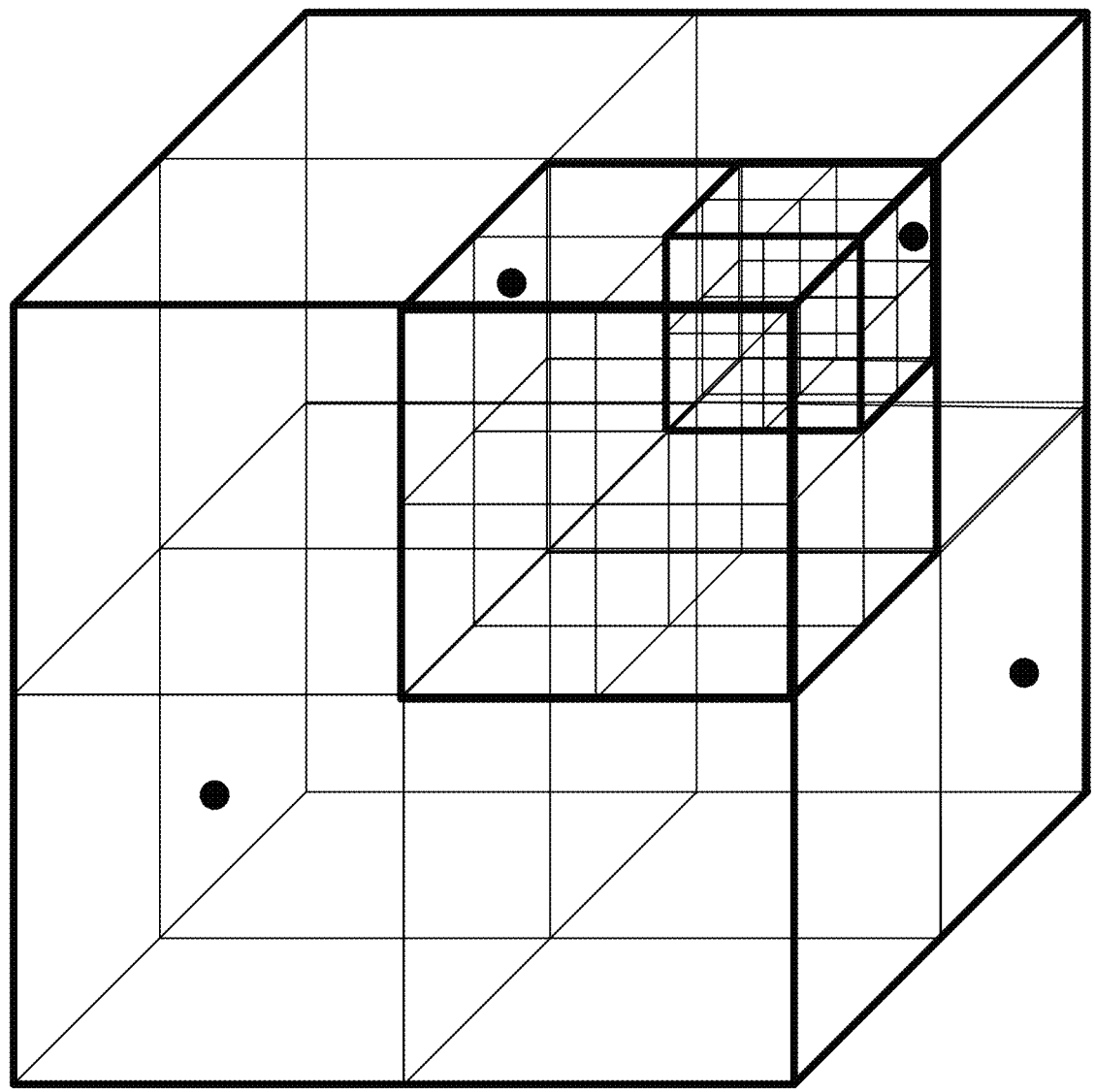
FIG. 4 is a conceptual diagram illustrating octree split for geometry coding.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded. FIG. 4 is a conceptual diagram illustrating octree split for geometry coding.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points.

LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . and LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

As mentioned above, there are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The predicting transform residuals (i.e., residual values) may be obtained after subtracting a predicted attribute value from a given attribute value. For example, G-PCC encoder 200 may derive the residuals as shown in equations (1) and (2), below:

$$\text{residual}_P = \text{attr}_P - \text{pred}_P \quad (1)$$

$$\text{residual}_S = \text{attr}_S - \text{pred}_S \quad (2)$$

In equations (1) and (2), $\text{residual}_p$ denotes a residual value of a primary component of an attribute of a point, $\text{attr}_p$ denotes a value of the primary component of the attribute of the point, $\text{pred}_p$ denotes a predicted value of the primary component of the attribute of the point, residuals denotes a residual value of a secondary component of the attribute of the point, $\text{attr}_s$ denotes a value of the secondary component of the attribute of the point, and $\text{pred}_s$ denotes a predicted value of the secondary component of the attribute of the point. In some examples, the primary component of the attribute is a luma value and the secondary component of the attribute is a chroma value. G-PCC encoder 200 and G-PCC decoder 300 may obtain the predicted value for each attribute (e.g., $\text{pred}_p$ and $\text{pred}_s$) either as one of a neighboring attribute value that is already reconstructed, or a weighted average of the attribute values of one or more neighboring attribute values. G-PCC encoder 200 and G-PCC decoder 300 may determine the neighboring attribute value from a list of candidates. The list of candidates may include a weighted average of attribute values of neighboring points and/or a set of attribute values of neighboring points. G-PCC encoder 200 and G-PCC decoder 300 may obtain the neighboring points by using an algorithm that takes into account the distance between the previously coded points; these points are obtained using a nearest neighbor algorithm from the previous coded levels of details (and in some cases previous coded point in the current level of detail).

For the secondary components of attributes, the residual value may be further predicted from the primary component residual using inter-component residual prediction (ICRP). ICRP is typically used when the predicting transform is applied. When ICRP is applied, G-PCC encoder 200 may derive the secondary residual as shown in equation (3), below:

$$\text{residual}_S = (\text{attr}_S - \text{pred}_S) - s_{ICRP} * \text{residual}_P \quad (3)$$

In equation (3), residuals denotes the residual value of the secondary component, $\text{attr}_s$ denotes the value of the secondary component, $\text{pred}_s$ denotes a predicted value of the secondary component, the factor $s_{ICRP}$ denotes an ICRP scale factor that is applicable for the particular point, and $\text{residual}_p$ denotes the residual value of the primary component. G-PCC encoder 200 may signal the ICRP scale factor for each layer or level-of-detail. G-PCC encoder 200 may signal different scale factors for different components of an attribute. In some examples, the scale factors may have fractional bits, in which case the operations may include offset and shift to apply the correct scale value.

At G-PCC decoder 300, the reconstructed attribute of a secondary component may be derived as shown in equation (4), below:

$$\text{recoil}_S = \text{residual}_S + s_{ICRP} * \text{residual}_P + \text{pred}_S \quad (4)$$

In equation (4), recons denotes a reconstructed value of the secondary component, residuals denotes the residual value of the secondary component, $s_{ICRP}$ denotes the ICRP scale factor, $\text{residual}_p$ denotes the residual value of the primary component, and $\text{pred}_s$ denotes the predicted value of the secondary component.

Under the lifting transform, G-PCC encoder 200 and G-PCC decoder 300 may use last component residual prediction to take advantage of the correlation between the residual values of the last two components of an attribute. Unlike ICRP, which is applied to all the secondary components of an attribute, LCRP is only applied to predict the residual of the last component of the attribute.

The last component residual, $\text{residual}_{last}$ may be derived from the residual of the penultimate component, $\text{residual}_{penul}$ as shown in equation (5), below:

$$\text{residual}_{last} = s_{LCRP} * \text{residual}_P \quad (5)$$

In equation (5), $\text{residual}_{last}$ denotes a residual value of the last component, $s_{LCRP}$ denotes an LCRP scale factor, and $\text{residual}_p$ denotes a residual value of the penultimate component. Note that under LCRP, the residual value of the last component is not signaled.

At G-PCC encoder 200 and G-PCC decoder 300, the reconstructed attribute of a secondary component may be derived as shown in equation (6), below:

$$\text{recon}_{last} = \text{residual}_{last} + \text{pred}_{last} = s_{LCRP} * \text{residual}_{penul} + \text{pred}_{last} \quad (6)$$

In equation (6), $\text{recon}_{last}$ denotes a reconstructed value of the last component, $\text{residual}_{last}$ denotes the residual value of the last component, $s_{LCRP}$ denotes the LCRP scale factor, $\text{residual}_{penul}$ denotes the residual value of the penultimate component, and $\text{pred}_{last}$ denotes the predicted value of the last component.

In a current draft of G-PCC, the boundaries of regions for specifying attribute quantization parameter (QP) values are conditioned based on the node size of a slice. A slice is part of or an entire coded point cloud frame, and may include a geometry data unit and zero or more corresponding attribute data units. The node size of the slice is specified for octree geometry coding. However, node size is not specified for predictive geometry coding. Thus, it is unclear in the current draft of G-PCC what constraint should apply for predictive geometry coding.

To address this problem, this disclosure proposes to apply a first constraint (e.g., region boundary constraint) for the octree coding case, and apply a second constraint for the predictive geometry coding case. In one example, the first and second constraint may be identical. In some examples, the constraint may be modified as shown with <ADD> . . . </ADD> tags to show addition and <DELETE> . . . </DELETE> tags to show deletion as follows:
<ADD> When geom_tree_type is equal to 0, i<ADD><DELETE>l</DELETE>t is a requirement of bitstream conformance that the following condition is true for k=0 . . . 2:
AttrRegionQpOriginStv[i][k]+AttrRegionQpSizeStv[i][k]<=(1<<NodeSizesLog2[0][k])
When geom_tree_type is not equal to 0, the bitstream constraint may be modified as follows:
AttrRegionQpOriginStv[i][k]+AttrRegionQpSizeStv[i][k]<=<ADD>N</ADD>
where N is a fixed quantity that is pre-determined or signaled in the bitstream.

Geom_tree_type equal to 0 may specify that position information is coded using an octree, geom_tree_type equal to 1 may specify that position information is coded using a predictive tree. In some examples, the arrays AttrRegionQpOriginStv and AttrRegionQpSizeStv, with values AttrRegionQpOriginStv[i][k] and AttrRegionQpSizeStv[i][k], for n=0 . . . ash_attr_region_cnt−1 and k=0 . . . 2, may represent the region origin and size, respectively permuted into the coded geometry axis order as follows:
AttrRegionQpOriginStv[i][XyzToStv[k]]=ash_attr_qp_region_origin_xyz[i][k]
AttrRegionQpSizeStv[i][XyzToStv[k]]=ash_attr_qp_region_size_minus1_xyz[i] [k]+1
ash_attr_qp_region_origin_xyz[i][k] and ash_attr_qp_region_size_minus1_xyz[i][k] may specify the i-th spatial region within the current slice where ash_attr_region_qp_offset[i][k] is applied. ash_attr_qp_region_origin_xyz[i][k] may be the k-th component of the (x, y, z) origin co-ordinate of the i-th region relative to the slice origin. ash_attr_qp_region_size_minus1_xyz[i][k] plus 1 may be the k-th component of the i-th region width, height, and depth, respectively.

In the current draft of G-PCC, ICRP coefficients (i.e., ICRP scale factors) are signaled with a fractional precision of 2 bits, i.e., when a value of 4 is signaled, it corresponds to a scale value of 1. Similarly, a signaled value of 5 corresponds to a scale value of 1.25. However, there is no specified limit for the range of signaled values. This may result in situations where an arbitrarily large value of the ICRP coefficient is signaled that may lead to an overflow in one of the internal operations of the codec. Moreover, G-PCC decoder 300 may need to keep track of potentially large values which may not be beneficial (typically scale values greater than 4 or 8 are not used very often). A similar issue exists for the scale value/coefficient associated with LCRP.

To address this problem, this disclosure proposes to constrain the values of ICRP and LCRP coefficients (e.g., $s_{ICRP}$ and $s_{LCRP}$) as shown the following text, which indicates proposed changes from the current draft of the G-PCC standard (e.g., with added text shown in <ADD> . . . </ADD> tags:
last_comp_pred_coeff_delta[i] specifies the delta scaling value for the predicted value of last component in the i-th detail layer from second component of a multi component attribute. When last_comppred_coeff_delta[i] is not present, it is inferred to be 0. <ADD> The value of last_comppred_coeff_delta[i] shall be in the range of −8 to 8, inclusive.</ADD>
The array LastCompPredCoeff, with elements LastCompPredCoeff[i] with i=0 . . . num_detail_levels_minus1 is derived as follows:

```
initCoeff = last_component_prediction_enabled_ flag << 2
for (i = 0; i <= num_detail_levels_minus1; i++){
    predCoeff = !i ? initCoeff : LastCompPredCoeff[i - 1]
    LastCompPredCoeff[i] = predCoeff + last_comp_pred_coeff_delta[i]
}
``` inter_comp_pred_coeff_delta[i][c] specifies the k-th delta scaling value for the predicted value of non-primary component in the i-th detail layer from primary component of a multi component attribute. When inter_comp_pred_coeff_delta[i][c] is not present, it is inferred to be 0. <ADD> The value of inter_comp_pred_coeff_delta[i] shall be in the range of −8 to 8, inclusive.</ADD>
The array InterCompPredCoeff, with elements InterCompPredCoeff[i][c] with i=0 . . . num_detail_levels_minus1 and c=1 . . . AttrDim−1 is derived as follows:

```
initCoeff = lifting_inter_component_prediction_enabled_flag << 2
for (i = 0; i <= num_detail_levels_minus1; i++)
    for (c = 1; c < AttrDim; c++) {
        predCoeff + !i ? initCoeff : InterCompPredCoeff[i - 1][c]
        InterCompPredCoeff[i][c] = predCoeff + inter_comp_pred_coeff_delta[i][c]
    }
```

In the text above, last_comp_pred_coeff_delta and inter_comp_pred_coeff_delta are syntax elements that G-PCC encoder 200 may signal in a bitstream. G-PCC decoder 300 may use last_comp_pred_coeff_delta and inter_comp_pred_coeff_delta to determine the values of LCRP and ICRP coefficients, respectively.

In other examples, other value ranges may be applied for the ICRP and LCRP coefficients. The value ranges may also be different for ICRP coefficients and LCRP coefficients. For example, ICRP coefficients may be in the range −8 to 8, inclusive, whereas LCRP coefficients may be in the range −4 to 4, inclusive.

In the current draft of the G-PCC standard, the predicting transform residuals are not constrained, and an arbitrarily large residual value may be signaled. However, given a certain input range of attribute values, the range of the residual values is limited. Residual values that are beyond this range may result in overflow of registers/data storage in codec operations.

This disclosure describes techniques that may address this issue. For instance, in accordance with a technique of this disclosure, a constraint may be added to ensure that one or more operations at G-PCC decoder 300 do not exceed a bit limit. This constraint may ensure that G-PCC decoder 300 can work with a fixed bit width. For example, if G-PCC decoder 300 is not configured to have internal variable/temporary variables in the process exceed 32 bits (e.g., G-PCC decoder 300 is not configured to process internal variable/temporary variables that exceed 32 bits), a constraint may be added to ensure that temporary results of operations do not exceed 32 bits. In some examples, residual values may be constrained to be within a particular range. In the predicting transform, the following constraint may be added:
    For predicting transform, the value of CoeffLevel[ ][ ] shall be in the range of $[-2^{bd-1}, 2^{bd-1}]$.
In some examples, the value of CoeffLevel may be clipped to this range. In some examples, the above constraint/clip shall only apply to the primary component of the attribute. The secondary component may have a similar constraint/clip with a different value. For example, if the maximum and minimum ICRP coefficients have value $2^n$ (+C) and $-2^n$ (−C), then the value of CoeffLevel[ ] for the secondary bit depth may be constrained/clipped in the range of $[-2^{bd-1}\text{-}C*2^{bd-1}, 2^{bd-1}*2^{bd+n-1}]$ (here C may not include fractional bits). In some examples, G-PCC decoder 300 may apply clipping at one or more operations. More generally, the constraint/clip may be dependent on the bit depth of the attribute component and the max/minimum value of the ICRP coefficients.

The attribute values in the lifting transform are updated using the prediction and update stages as defined in the draft of G-PCC. In addition, coefficient weights are derived to apply the relative importance of the points in the values LODs.

The coefficient weights are applied in the scaling and quantization operations using the variables quantWeight and iQuantWeight derived as follows:

Code Listing 1

```
const int 64_t iQuantWeight=irsqrt(weights[predicto-
    rIndex]);

const    int64_t    quantWeight=(weights
    [predictorIndex]*iQuantWeight+
    (lull<<39))>>40;
```

In Code Listing 1 above, predictorindex is an index of a component of an attribute, weights [predictorindex] indicates a coefficient weight for a component indicated by predictorindex, irsqrt( ) is a function that returns an integer square root, iQuantWeight is a variable indicating an integer square root of a coefficient weight of the component indicated by predictorIndex, quantWeight is a quantized coefficient weight, and lull is an unsigned long long value equal to 1.

The quantization operation for the coefficients (after prediction update process) is applied as follows:

Code Listing 2

```
auto& color=colors[predictorIndex];

int values[3];

values[0]=quant[0].quantize(color[0]*quantWeight);
```

In Code Listing 2 above, colors[ ] is an array of values of components of an attribute, quant[ ] is an array of quantization parameters (QPs), and values [ ] is an array of quantized values of components. quant[0].quantize( ) indicates a function to quantize the parameter (e.g., color[0] *quantWeight) using the QP at position 0 of the quant[ ] array.

At G-PCC decoder 300, the residual values[ ] are used to derive the coefficient using the inverse quantization process as follows:

Code Listing 3

```
int64_t scaled=quant[0].scale(values[0]);

color[0]=divExp2RoundHalfInf
    (scaled*iQuantWeight, 40);
```

In Code Listing 3 above, quant[0].scale( ) is a function to scale the parameter (e.g., values [0]) by the QP at position 0 of the quant[ ] array. The function divExp2RoundHalfInf (x, y) shifts value x by y bits to the right. Thus, divExp2RoundHalfInf is effectively a division operation, but the resulting value is rounded.

For the last component, additionally, the last component residual prediction may be used as follows (steps in <E> . . . </E> tags apply to only encoder steps, steps not enclosed in <E> . . . </E> tags are applied at G-PCC encoder 200 and G-PCC decoder 300).

Code Listing 4

```
<E>values[1]=quant[1].quantize(color[1]*quant-
    Weight);</E> scaled=quant[1].scale(values[1]);

color[1]=divExp2RoundHalfInf
    (scaled*iQuantWeight, 40);

<E>color[2]-=(lastCompPredCoeff*color[1])>>
    2;</E> scaled*=lastCompPredCoeff;

scaled>>=2;

<E>values[2]=quant[1].quantize(color[2]*quant-
    Weight);</E> scaled+=quant[1].scale(values[2]);

color[2]=divExp2RoundHalfInf
    (scaled*iQuantWeight, 40);
```

Depending on the input bit depth of the attributes, bit overflow may occur in some of the steps above, which may affect the reconstructed quality of the attributes. Due to the fixed point representation of the coefficient weights, and 64-bit internal variables, when the value of a lifting coefficient exceeds 15 bits (or rather 15+8=23 bits if the internal bit shift of 8 bits is taken into account), the reconstructed value may not be as intended due to overflow (e.g., when values[0] is 16 bits in the equation int64_t scaled=quant[0] .scale(values[0]); in Coding Listing 3, the subsequent operation encounters an overflow.

In accordance with a technique of this disclosure, a constraint may be added that requires that the value of scaled*iQuantWeight does not exceed 64 bits for any of the components of the attribute. In other words, the value of scaled*iQuantWeight belongs to the range of $[-2^{63}, 2^{63}-1]$.

In another example, a clipping operation may be applied instead of an explicit constraint. For example, for the 0-th component, the clipping may be applied as follows in Code Listing 5:

Code Listing 5

```
color[1]=divExp2RoundHalfInf(Clip(-2⁶³, 2⁶³-1,
    scaled*iQuantWeight), 40)
```

In Code Listing 5 above, clip(x, y, z) clips the value z so that z cannot be greater than y and cannot be less than x. In some examples, the value of [scaled*iQuantWeight+(1<<39)] may be constrained or clipped as above. Similar clipping may be applied to the other components.

In addition, in some examples, other constraints may also be applied to avoid overflow effectively or easily. For example, if the attribute bitdepth exceeds a certain threshold, the bit overflow may occur for trivial cases too. Hence the attribute bitdepth may be constrained to be less than a particular value. For example, the attribute bit depth may be constrained to be less than a fixed value (e.g., 15).

Similarly, there is currently no explicit constraint on the coefficient/residual that is signaled; the value of residual must also be constrained to be of a certain bitdepth. For example, the value of CoeffLevel[ ][ ][ ] may be constrained to be in the range $[-2^{31}, 2^{31}-1]$. Here, CoeffLevel[ ][ ][ ] is a variable storing residual values. In some examples, the signaled value of coefficient/residual, CoeffLevel[ ][ ][ ] may be clipped as Clip($-2^{31}$, $2^{31}-1$, CoeffLevel[ ][ ][ ]). This clipping may also apply to other transforms such as the predicting transform.

Thus, in accordance with the techniques of this disclosure, a constraint may limit at least one of: the first component of the attribute of the point, the residual value of the first component of the attribute of the point, the second component of the attribute, and the residual value of the second component of the attribute of the point to one or more predefined bitdepths (e.g., 15, 32, etc.). In some examples, such as examples involving ICRP, a constraint may limit a secondary component of an attribute of a point, the residual value of the secondary component of the attribute of the point, and the residual value of the primary component of the attribute of the second point to one or more second predefined bitdepths.

Figure 5:
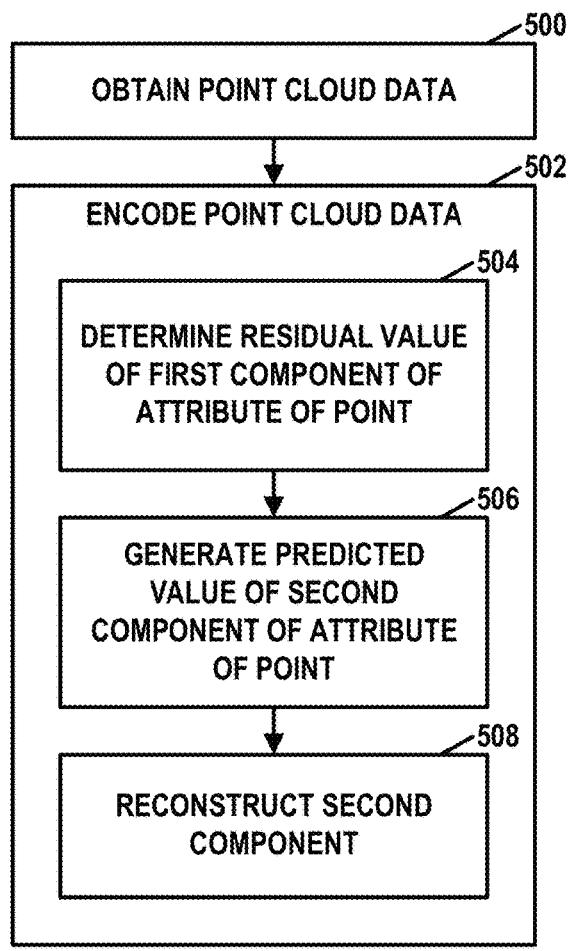
FIG. 5 is a flowchart illustrating an example operation for encoding point cloud data, in accordance with one or more techniques of this disclosure.

FIG. 5 is a flowchart illustrating an example operation for encoding point cloud data, in accordance with one or more techniques of this disclosure. The operations presented in the flowcharts of this disclosure are provided as examples. Other operations in accordance with the techniques of this disclosure may include more, fewer, or different actions, or the actions may be performed in different orders.

In the example of FIG. 5, G-PCC encoder 200 may obtain point cloud data (500). The point cloud data includes data indicating locations of points in a point cloud. Additionally, the point cloud data includes data indicating attributes of the points in the point cloud. G-PCC encoder 200 may obtain the point cloud data from data source 104, from memory 106, or otherwise receive or generate the point cloud data.

Furthermore, G-PCC encoder 200 may encode the point cloud data (502). Encoding the point cloud data may comprise generating a bitstream (e.g., attribute bitstream 205) that complies with one or more constraints. As part of generating the bitstream, G-PCC encoder 200 may determine a residual value of a first component of an attribute of a point (504). The first component may be a penultimate component of the attribute. For example, G-PCC encoder 200 may determine the residual value of the first component as a value of the first component minus a predicted value of the first component. In other words, G-PCC encoder 200 may determine the residual value of the first component as $residual_{penul} = attr_{penul} - pred_{penul}$. G-PCC encoder 200 may generate the predicted value of the first component as a neighboring attribute value that is already reconstructed, as a weighted average of the attribute values of one or more neighboring attribute values, or in another way. Similarly, G-PCC encoder 200 may generate a predicted value of a second component of the attribute of the point (506). G-PCC encoder 200 may generate the predicted value of the second component as a neighboring attribute value that is already reconstructed, as a weighted average of the attribute values of one or more neighboring attribute values, or in another way.

G-PCC encoder 200 may reconstruct the second component as a sum of the predicted value of the second component and a multiplication product of a scale factor for the second component and the residual value of the first component (508). For example, G-PCC encoder 200 may reconstruct the second component as indicated in equation (4), above. In some examples, G-PCC encoder 200 may reconstruct the second component (color[2]) as shown in Code Listing 4, above.

In the example of FIG. 5, the one or more constraints include a constraint that limits the first component of the attribute of the point, the residual value of the first component of the attribute of the point, the second component of the attribute, and the residual value of the second component of the attribute of the point to one or more predefined bitdepths. For example, the first component may be limited to a range of $[-2^{31}, 2^{31}-1]$.

In some examples, G-PCC encoder 200 may use ICRP to encode one or more points of the point cloud data. For instance, G-PCC encoder 200 may determine a residual value of a primary component of an attribute of a second point of the point cloud data (e.g., using equation (1), above). Additionally, G-PCC encoder 200 may determine a residual value of a secondary component of the attribute of the second point of the point cloud data (e.g., using equation (3), above). G-PCC encoder 200 may generate a predicted value of the secondary component of the attribute of the second point. G-PCC encoder 200 may reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point (e.g., using equation (4). The one or more constraints may include a constraint that limits one or more of the secondary component of the attribute of the second point, the residual value of the secondary component of the attribute of the second point, or the residual value of the primary component of the attribute of the second point to one or more second predefined bitdepths. For example, the first component may be limited to a range of $[-2^{31}, 2^{31}-1]$.

Figure 6:
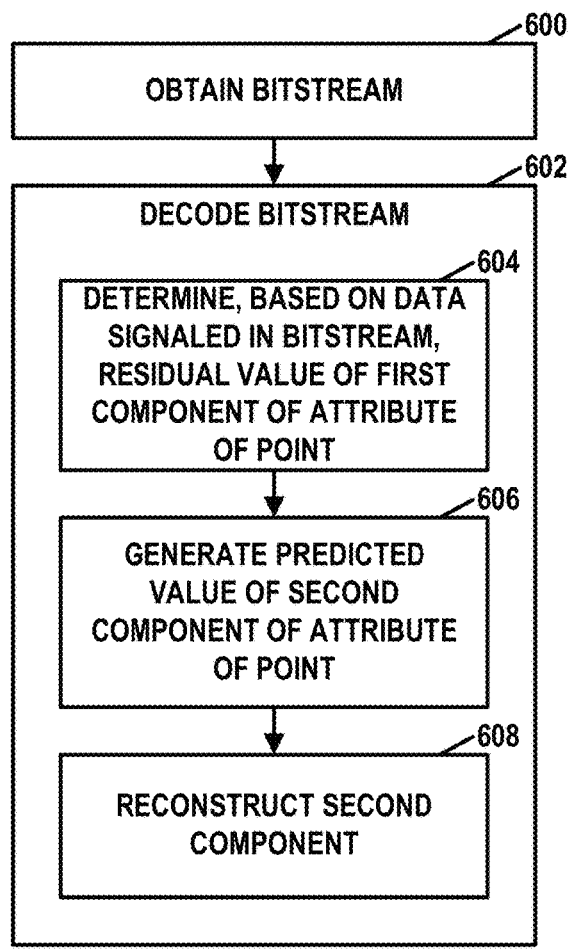
FIG. 6 is a flowchart illustrating an example operation for decoding point cloud data, in accordance with one or more techniques of this disclosure.

FIG. 6 is a flowchart illustrating an example operation for decoding point cloud data, in accordance with one or more techniques of this disclosure. In the example of FIG. 6, G-PCC decoder 300 may obtain a bitstream that is encoded to comply with one or more constraints (600). G-PCC decoder 300 may obtain the bitstream from input interface 122, memory 120, or another source. G-PCC decoder 300 may decode the bitstream (602).

As part of decoding the bitstream, G-PCC decoder 300 may determine, based on data signaled in the bitstream, a residual value of a first component of an attribute of a point of the point cloud data (604). For example, G-PCC decoder 300 may obtain a syntax element from attribute bitstream 205 indicating the residual value of the first component.

Furthermore, G-PCC decoder 300 may generate a predicted value of a second component of the attribute of the point (606). G-PCC decoder 300 may generate the predicted value of the second component as a neighboring attribute value that is already reconstructed, as a weighted average of the attribute values of one or more neighboring attribute values, or in another way.

G-PCC decoder 300 may reconstruct the second component as a sum of the predicted value of the second component and a multiplication product of a scale factor for the second component and the residual value of the first component (608). For instance, G-PCC decoder 300 may reconstruct the second component as indicated in equation (4), above. In some examples, G-PCC decoder 300 may reconstruct the second component (color[2]) as shown in Code Listing 4, above.

In the example of FIG. 6, the one or more constraints include a constraint that limits the first component of the attribute of the point, the residual value of the first component of the attribute of the point, the second component of the attribute, and the residual value of the second component of the attribute of the point to one or more predefined bitdepths. For example, the residual value of the first component may be limited to a range of $[-2^{31}, 2^{31}-1]$.

In some examples, G-PCC decoder 300 may use ICRP to decode one or more points of the point cloud data. For instance, G-PCC decoder 300 may determine, based on the data signaled in the bitstream, a residual value of a primary component of an attribute of a second point of the point cloud data (e.g., using equation (1), above). Additionally, G-PCC decoder 300 may determine, based on the data signaled in the bitstream, a residual value of a secondary component of the attribute of the second point of the point cloud data. G-PCC decoder 300 may generate a predicted value of the secondary component of the attribute of the second point. G-PCC decoder 300 may reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point (e.g., using equation (4). The one or more constraints may include a constraint that limits the secondary component of the attribute of the second point to a second predefined bitdepth. one or more of the secondary component of the attribute of the second point, the residual value of the secondary component of the attribute of the second point, or the residual value of the primary component of the attribute of the second point to one or more second predefined bitdepths. For example, the first component may be limited to a range of $[-2^{31}, 2^{31}-1]$.

Figure 7:
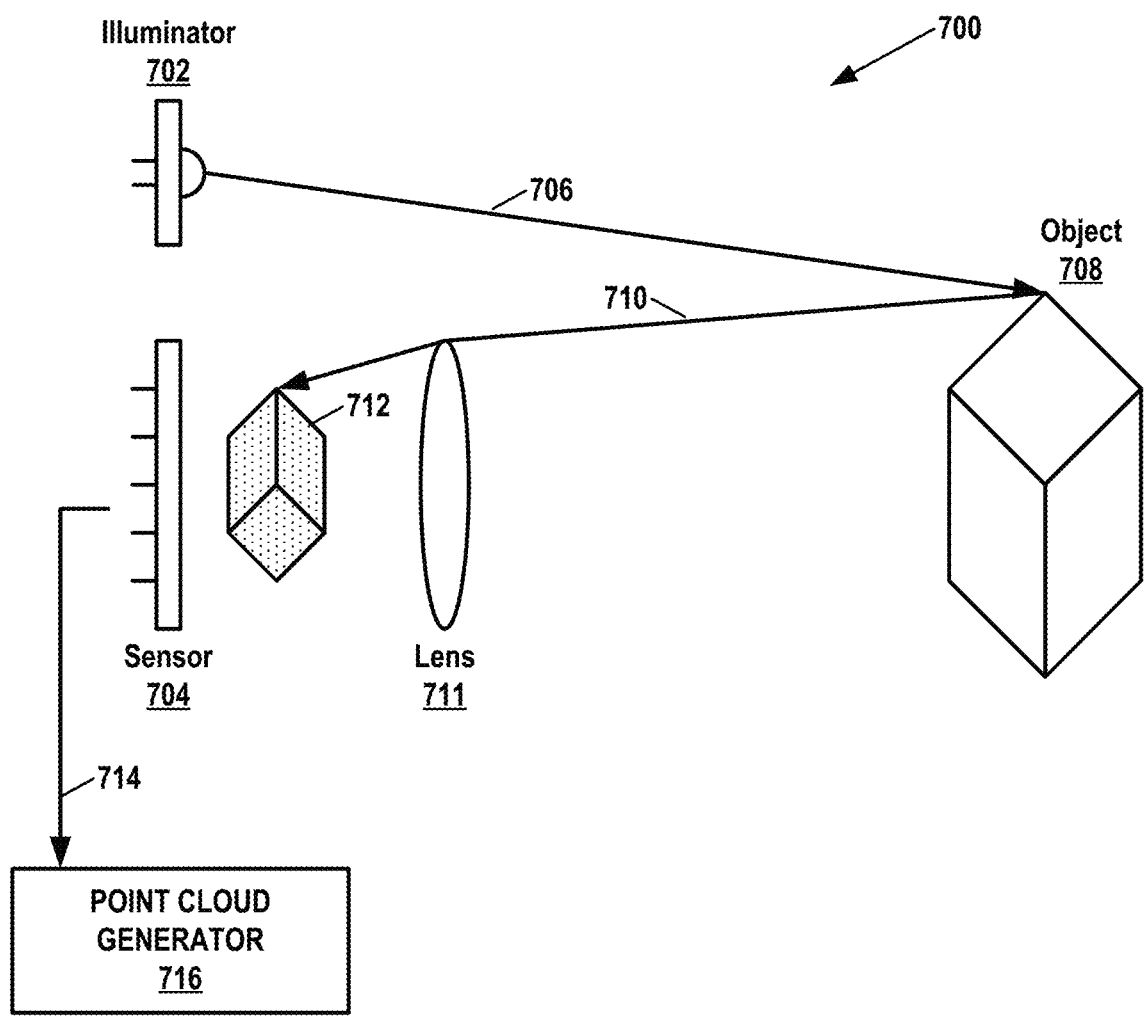
FIG. 7 is a conceptual diagram illustrating an example range-finding system that may be used with one or more techniques of this disclosure.

FIG. 7 is a conceptual diagram illustrating an example range-finding system 700 that may be used with one or more techniques of this disclosure. In the example of FIG. 7, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 714 based on image 712. Image 712 may comprise a set of points (e.g., as represented by dots in image 712 of FIG. 7).

In some examples, illuminator 702 and sensor 704 may be mounted on a spinning structure so that illuminator 702 and sensor 704 capture a 360-degree view of an environment (e.g., a spinning LIDAR sensor). In other examples, range-finding system 700 may include one or more optical components (e.g., mirrors, collimators, diffraction gratings, etc.) that enable illuminator 702 and sensor 704 to detect ranges of objects within a specific range (e.g., up to 360-degrees). Although the example of FIG. 7 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air). In some examples, rather than (or in addition to) modulating the amplitude of the emitted light 706, illuminator 702 may modulate the phase of the emitted light 706. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, a point cloud may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 716 that may calculate the disparities between locations in the stereo images. Range-finding system 700 may then use the disparities to determine distances to the locations shown in the stereo images. From these distances, point cloud generator 716 may generate a point cloud.

Sensors 704 may also detect other attributes of object 708, such as color and reflectance information. In the example of FIG. 7, a point cloud generator 716 may generate a point cloud based on signals 714 generated by sensor 704. Range-finding system 700 and/or point cloud generator 716 may form part of data source 104 (FIG. 1). Hence, point cloud data generated by range-finding system 700 may be encoded and/or decoded according to any of the techniques of this disclosure.

Figure 8:
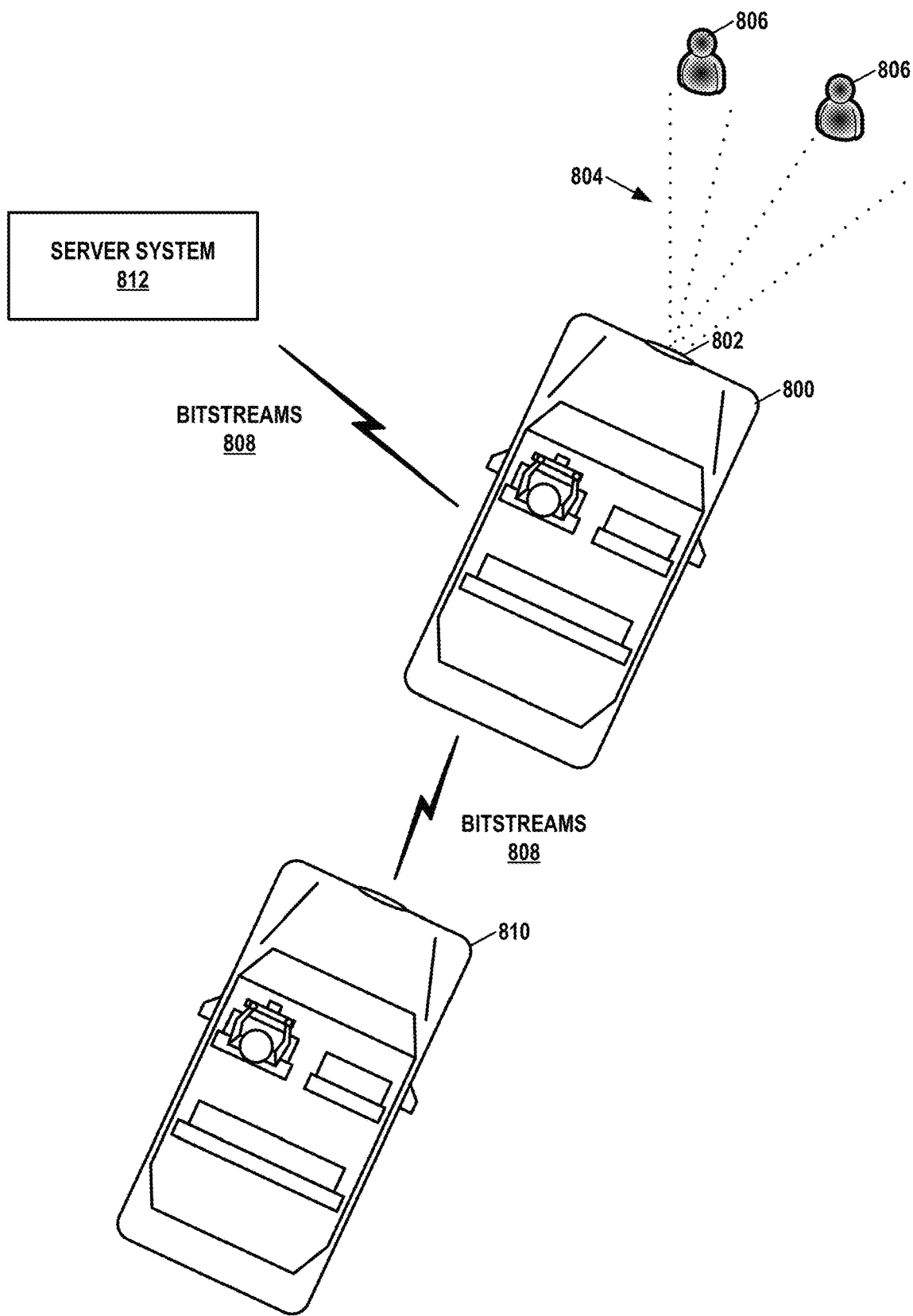
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 800 includes a range-finding system 802. Range-finding system 802 may be implemented in the manner discussed with respect to FIG. 8. Although not shown in the example of FIG. 8, vehicle 800 may also include a data source, such as data source 104 (FIG. 1), and a G-PCC encoder, such as G-PCC encoder 200 (FIG. 1). In the example of FIG. 8, range-finding system 802 emits laser beams 804 that reflect off pedestrians 806 or other objects in a roadway. The data source of vehicle 800 may generate a point cloud based on signals generated by range-finding system 802. The G-PCC encoder of vehicle 800 may encode the point cloud to generate bitstreams 808, such as geometry bitstream (FIG. 2) and attribute bitstream (FIG. 2). Bitstreams 808 may include many fewer bits than the unencoded point cloud obtained by the G-PCC encoder.

An output interface of vehicle 800 (e.g., output interface 108 (FIG. 1) may transmit bitstreams 808 to one or more other devices. Bitstreams 808 may include many fewer bits than the unencoded point cloud obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 8, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud. Vehicle 810 may use the reconstructed point cloud for various purposes. For instance, vehicle 810 may determine based on the reconstructed point cloud that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud.

Additionally or alternatively, vehicle 800 may transmit bitstreams 808 to a server system 812. Server system 812 may use bitstreams 808 for various purposes. For example, server system 812 may store bitstreams 808 for subsequent reconstruction of the point clouds. In this example, server system 812 may use the point clouds along with other data (e.g., vehicle telemetry data generated by vehicle 800) to train an autonomous driving system. In other example, server system 812 may store bitstreams 808 for subsequent reconstruction for forensic crash investigations. Avoiding overflow conditions in residual values may be important to avoid poor quality point cloud data, which may have a negative impact on various uses of the point cloud data, such as autonomous navigation.

Figure 9:
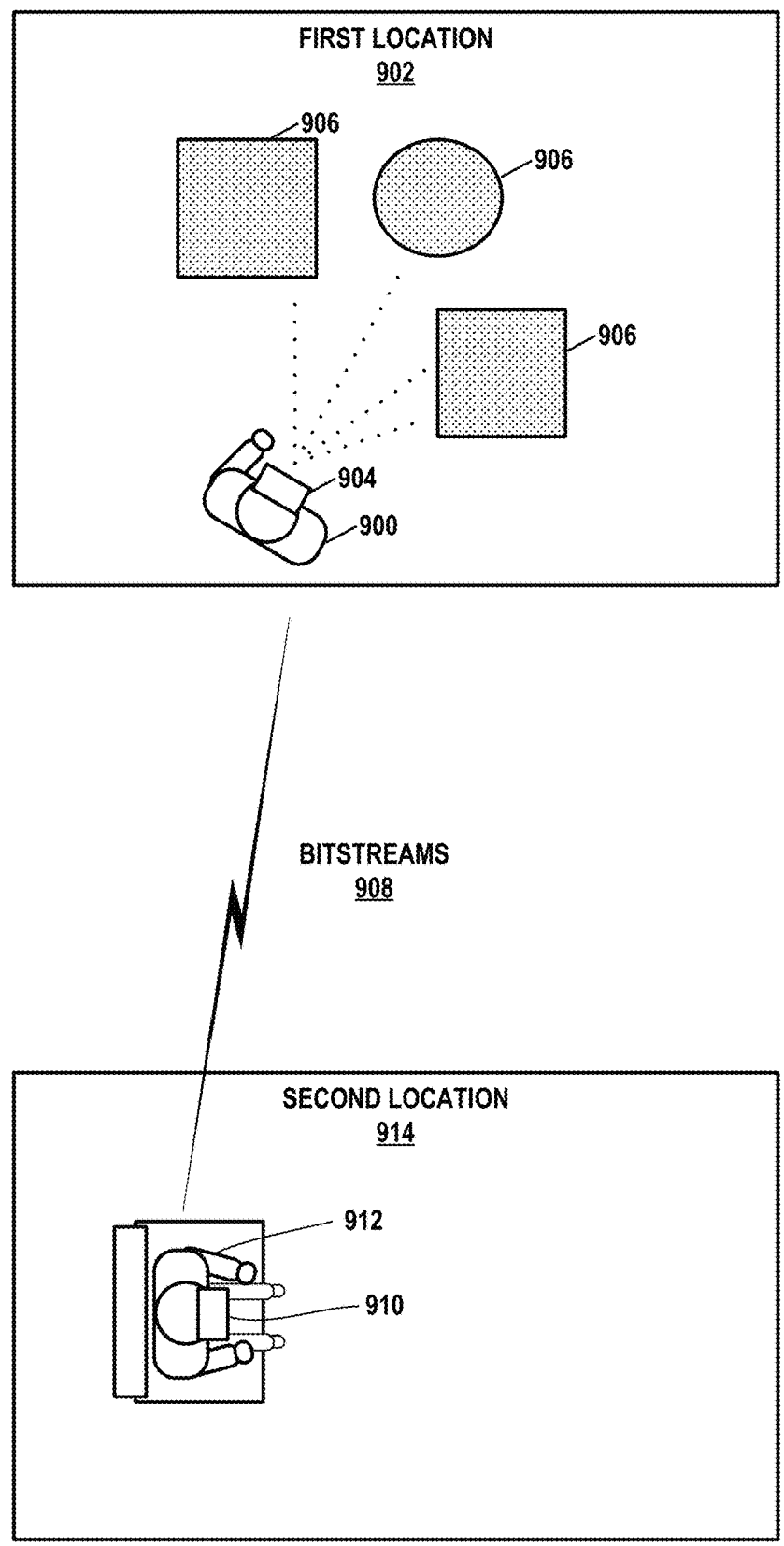
FIG. 9 is a conceptual diagram illustrating an example extended reality system in which one or more techniques of this disclosure may be used.

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 9, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate a point cloud representation of objects 906 at location 902. XR headset 904 may include a G-PCC encoder (e.g., G-PCC encoder 200 of FIG. 1) that is configured to encode the point cloud to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud. XR headset 910 may use the point cloud to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples, XR headset 910 may determine a position of a virtual object based on the reconstructed point cloud. For instance, XR headset 910 may determine, based on the reconstructed point cloud, that an environment (e.g., location 902) includes a flat surface and then determine that a virtual object (e.g., a cartoon character) is to be positioned on the flat surface. XR headset 910 may generate an XR visualization in which the virtual object is at the determined position. For instance, XR headset 910 may show the cartoon character sitting on the flat surface. Avoiding overflow conditions in residual values may be important to avoid poor quality point cloud data, which may limit the realism of XR visualizations.

Figure 10:
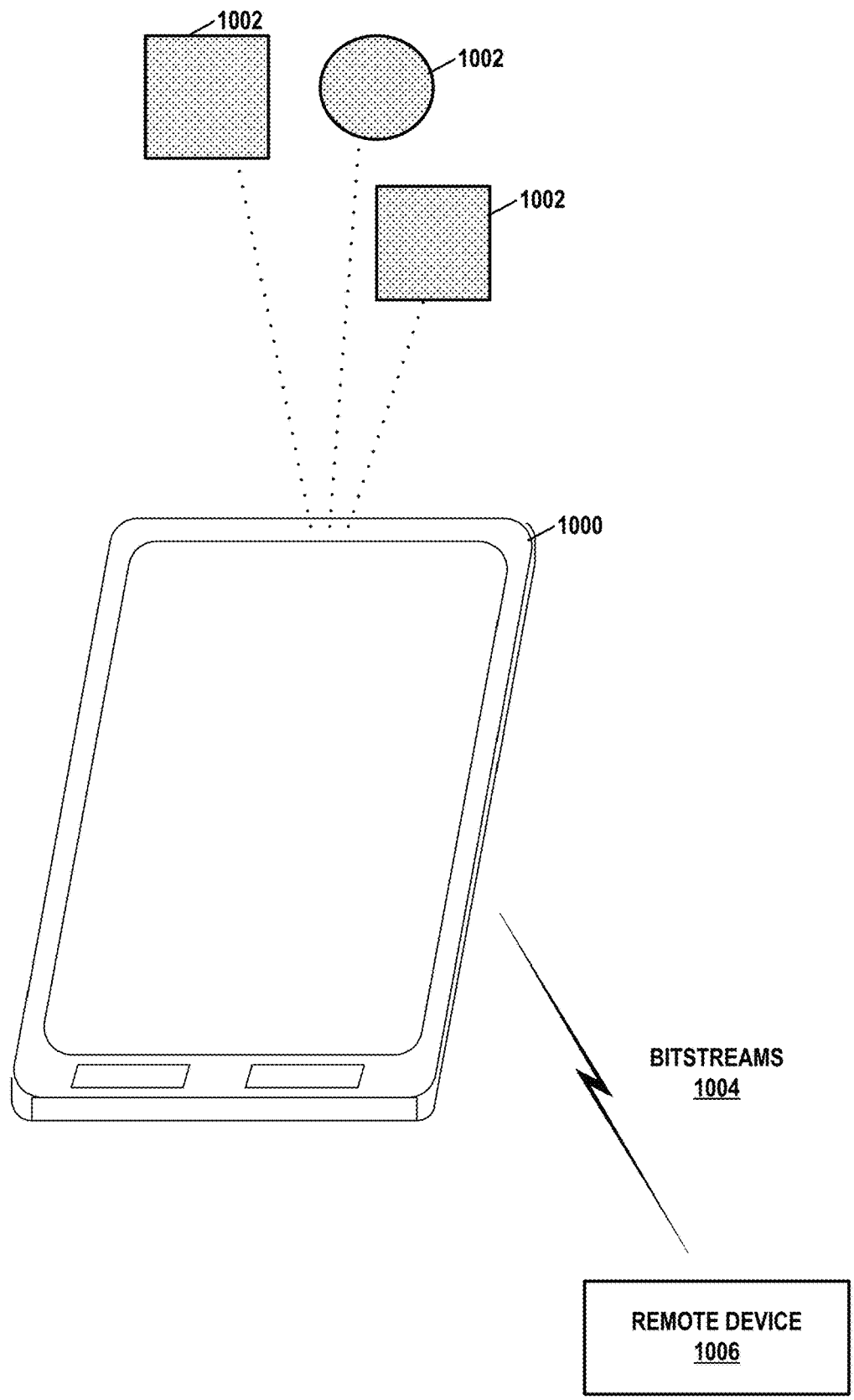
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 1000 (e.g., a wireless communication device), such as a mobile phone or tablet computer, includes a range-finding system, such as a LIDAR system, that detects positions of points on objects 1002 in an environment of mobile device 1000. A data source of mobile device 1000 may use the signals generated by the depth detection sensor to generate a point cloud representation of objects 1002. Mobile device 1000 may include a G-PCC encoder (e.g., G-PCC encoder 200 of FIG. 1) that is configured to encode the point cloud to generate bitstreams 1004. In the example of FIG. 10, mobile device 1000 may transmit bitstreams to a remote device 1006, such as a server system or other mobile device. Remote device 1006 may decode bitstreams 1004 to reconstruct the point cloud. Remote device 1006 may use the point cloud for various purposes. For example, remote device 1006 may use the point cloud to generate a map of environment of mobile device 1000. For instance, remote device 1006 may generate a map of an interior of a building based on the reconstructed point cloud. In another example, remote device 1006 may generate imagery (e.g., computer graphics) based on the point cloud. For instance, remote device 1006 may use points of the point cloud as vertices of polygons and use color attributes of the points as the basis for shading the polygons. In some examples, remote device 1006 may use the reconstructed point cloud for facial recognition or other security applications.

The following is a non-limiting list of clauses that may be in accordance with one or more techniques of this disclosure. Examples in the various clauses of this disclosure may be used individually or in combination.

Clause 1A: A method includes obtaining a bitstream that comprises encoded point cloud data; and determining, based on compliance of a bitstream with one or more of the constraints described in this disclosure, whether a decoder is configured to decode the point cloud data.

Clause 2A: The method of clause 1A, further comprising decoding the point cloud data.

Clause 3A: A method includes obtaining point cloud data; and encoding the point cloud data, when encoding the point cloud data comprises generating a bitstream that complies with one or more of the constrains described in this disclosure.

Clause 4A: A method includes obtaining a bitstream that comprises encoded point cloud data; and determining whether the bitstream complies with one or more of the constraints described in this disclosure.

Clause 5A: A method includes obtaining a bitstream that comprises encoded point cloud data; and decoding the point cloud data, wherein decoding the point cloud data comprises performing one or more of the clipping operations described in this disclosure.

Clause 6A: A method includes obtaining point cloud data; and encoding the point cloud data, when encoding the point cloud data comprises performing one or more of the clipping operations described in this disclosure.

Clause 7A: The method of any of clauses 1A-6A, wherein one or more of the constraints or clipping operations ensures that an operation of a decoder does not exceed a bit depth.

Clause 8A: The method of any of clauses 1A-6A, wherein one or more of the constraints or clipping operations of this disclosure is dependent on a bit depth of an attribute component of the point cloud data and a minimum and maximum value of inter-component residual prediction coefficients.

Clause 9A: A method comprising any combination of the methods of clauses 1A-8A.

Clause 10A: A device comprising one or more means for performing the method of any of clauses 1A-9A.

Clause 11A: The device of clause 10A, wherein the one or more means comprise one or more processors implemented in circuitry.

Clause 12A: The device of any of clauses 10A or 11A, further comprising a memory to store the point cloud data.

Clause 13A: The device of any of clauses 10A-12A, wherein the device comprises a decoder.

Clause 14A: The device of any of clauses 10A-13A, wherein the device comprises an encoder.

Clause 15A: The device of any of clauses 10A-14A, further comprising a device to generate the point cloud data.

Clause 16A: The device of any of clauses 10A-15A, further comprising a display to present imagery based on the point cloud.

Clause 17A: A computer-readable storage medium having stored thereon instructions that, when executed, cause one or more processors to perform the method of any of clauses 1A-9A.

Clause 1B: A method of decoding point cloud data includes obtaining a bitstream that is encoded to comply with one or more constraints; and decoding the bitstream, wherein decoding the bitstream comprises: determining, based on data signaled in the bitstream, a residual value of a first component of an attribute of a point of the point cloud data; generating a predicted value of a second component of the attribute of the point; and reconstructing the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 2B: The method of clause 1B, wherein the point is a first point of the point cloud data, the predefined bitdepths are first bitdepths, and decoding the bitstream further comprises: determining, based on the data signaled in the bitstream, a residual value of a primary component of an attribute of a second point of the point cloud data; determining, based on the data signaled in the bitstream, a residual value of a secondary component of the attribute of the second point of the point cloud data; generating a predicted value of the secondary component of the attribute of the second point; and reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 3B: The method of any of clauses 1B and 2B, wherein the method further comprises clipping the residual value of the first component of the attribute of the point to one of the predefined bitdepths.

Clause 4B: The method of any of clauses 1B through 3B, wherein the method further comprises determining, based on compliance of the bitstream with the one or more constraints, whether to decode the point cloud data.

Clause 5B: The method of any of clauses 1B through 4B, wherein determining the residual value of the first component of the point comprises inverse quantizing a signaled value of the first component, wherein the signaled value of the first component is signaled in the bitstream.

Clause 6B: A method of encoding point cloud data includes obtaining the point cloud data; and encoding the point cloud data, wherein encoding the point cloud data comprises generating a bitstream that complies with one or more constraints, wherein generating the bitstream comprises: determining a residual value of a first component of an attribute of a point; generating a predicted value of a second component of the attribute of the point; and reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 7B: The method of clause 6B, wherein the point is a first point, the predefined bitdepths are first predefined bitdepths, and encoding the point cloud data further comprises: determining a residual value of a primary component of an attribute of a second point of the point cloud data; determining a residual value of a secondary component of the attribute of the second point of the point cloud data; generating a predicted value of the secondary component of the attribute of the second point; and reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 8B: The method of any of clauses 6B and 7B, wherein the method further comprises clipping the residual value of the first component to one of the predefined bitdepths.

Clause 9B: The method of any of clauses 6B through 8B, wherein determining the residual value of the first component comprises inverse quantizing a signaled value of the first component, wherein the signaled value of the first component is signaled in the bitstream.

Clause 10B: The method of any of clauses 6B through 9B, further comprising generating the point cloud data.

Clause 11B: A device includes a memory configured to store point cloud data; and one or more processors coupled to the memory and implemented in circuitry, the one or more processors configured to: obtain a bitstream that is encoded to comply with one or more constraints; and decode the bitstream, wherein the one or more processors are configured to, as part of decoding the bitstream: determine, based on data signaled in the bitstream, a residual value of a first component of an attribute of a point of the point cloud data; generate a predicted value of a second component of the attribute of the point; and reconstruct the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 12B: The device of clause 11B, wherein the point is a first point of the point cloud data, the predefined bitdepths are first bitdepths, and the one or more processors are configured to, as part decoding the bitstream: determine, based on the data signaled in the bitstream, a residual value of a primary component of an attribute of a second point of the point cloud data; determine, based on the data signaled in the bitstream, a residual value of a secondary component of the attribute of the second point of the point cloud data; generate a predicted value of the secondary component of the attribute of the second point; and reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 13B: The device of any of clauses 11B and 12B, wherein the one or more processors are further configured to clip the residual value of the first component to one of the predefined bitdepths.

Clause 14B: The device of any of clauses 11B through 13B, wherein the one or more processors are further configured to determine, based on compliance of the bitstream with the one or more constraints, whether to decode the point cloud data.

Clause 15B: The device of any of clauses 11B through 14B, wherein the one or more processors are configured to, as part of determining the residual value of the first component, inverse quantize a signaled value of the first component, wherein the signaled value of the first component is signaled in the bitstream.

Clause 16B: A device includes a memory configured to store point cloud data; and one or more processors coupled to the memory and implemented in circuitry, the one or more processors configured to encode the point cloud data, wherein the one or more processors are configured to, as part of encoding the point cloud data, generate a bitstream that complies with one or more constraints, wherein the one or more processors are configured to, as part of generating the bitstream: determine a residual value of a first component of an attribute of a point; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 17B: The device of clause 16B, wherein the point is a first point, the predefined bitdepths are first predefined bitdepths, and the one or more processors are configured to, as part of encoding the point cloud data: determine a residual value of a primary component of an attribute of a second point of the point cloud data; determine a residual value of a secondary component of the attribute of the second point of the point cloud data; generate a predicted value of the secondary component of the attribute of the second point; and reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 18B: The device of any of clauses 16B and 17B, wherein the one or more processors are further configured to clip the residual value of the first component to one of the predefined bitdepths.

Clause 19B: The device of any of clauses 16B through 18B, wherein the one or more processors are configured to, as part of determining the residual value of the first component, inverse quantize a signaled value of the first component, wherein the signaled value of the first component is signaled in the bitstream.

Clause 20B: The device of any of clauses 16B through 19B, further comprising a sensor to generate the point cloud data.

Clause 21B: A device includes means for obtaining a bitstream that is encoded to comply with one or more constraints; and means for decoding the bitstream, wherein the means for decoding the bitstream comprises: means for determining, based on data signaled in the bitstream, a residual value of a first component of an attribute of a point of point cloud data; means for generating a predicted value of a second component of the attribute of the point; and means for reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 22B: A device includes means for obtaining point cloud data; and means for encoding the point cloud data, wherein the means for encoding the point cloud data comprises means for generating a bitstream that complies with one or more constraints, wherein the means for generating the bitstream comprises: means for determining a residual value of a first component of an attribute of a point; means for generating a predicted value of a second component of the attribute of the point; and means for reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 23B: A non-transitory computer-readable data storage medium having stored thereon instructions that, when executed, cause one or more processors to: obtain a bitstream that is encoded to comply with one or more constraints; and decode the bitstream, wherein the instructions that cause the one or more processors to decode the bitstream comprise instructions that, when executed, cause the one or more processors to: determine, based on data signaled in the bitstream, a residual value of a first component of an attribute of a point of point cloud data; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 24B: A non-transitory computer-readable data storage medium having stored thereon instructions that, when executed, cause one or more processors to: obtain point cloud data; and encode the point cloud data, wherein the instructions that cause the one or more processors to encode the point cloud data comprises instructions that, when executed, cause the one or more processors to generate a bitstream that complies with one or more constraints, wherein the instructions that cause the one or more processors to generate the bitstream comprise instructions that, when executed, cause the one or more processors to: determine a residual value of a first component of an attribute of a point; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 1C: A method of decoding point cloud data includes obtaining a bitstream that is encoded to comply with one or more constraints; and decoding the bitstream, wherein decoding the bitstream comprises: determining, based on data signaled in the bitstream, a residual value of a first component of an attribute of a point of the point cloud data; generating a predicted value of a second component of the attribute of the point; and reconstructing the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 2C: The method of clause 1C, wherein the point is a first point of the point cloud data, the predefined bitdepths are first bitdepths, and decoding the bitstream further comprises: determining, based on the data signaled in the bitstream, a residual value of a primary component of an attribute of a second point of the point cloud data; determining, based on the data signaled in the bitstream, a residual value of a secondary component of the attribute of the second point of the point cloud data; generating a predicted value of the secondary component of the attribute of the second point; and reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 3C: The method of clause 1C, wherein the method further comprises clipping the residual value of the first component of the attribute of the point to one of the predefined bitdepths.

Clause 4C: The method of clause 1C, wherein the method further comprises determining, based on compliance of the bitstream with the one or more constraints, whether to decode the point cloud data.

Clause 5C: The method of clause 1C, wherein determining the residual value of the first component of the point comprises inverse quantizing a signaled value of the first component, wherein the signaled value of the first component is signaled in the bitstream.

Clause 6C: A method of encoding point cloud data includes obtaining the point cloud data; and encoding the point cloud data, wherein encoding the point cloud data comprises generating a bitstream that complies with one or more constraints, wherein generating the bitstream comprises: determining a residual value of a first component of an attribute of a point; generating a predicted value of a second component of the attribute of the point; and reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 7C: The method of clause 6C, wherein the point is a first point, the predefined bitdepths are first predefined bitdepths, and encoding the point cloud data further comprises: determining a residual value of a primary component of an attribute of a second point of the point cloud data; determining a residual value of a secondary component of the attribute of the second point of the point cloud data; generating a predicted value of the secondary component of the attribute of the second point; and reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 8C: The method of clause 6C, wherein the method further comprises clipping the residual value of the first component to one of the predefined bitdepths.

Clause 9C: The method of clause 6C, wherein determining the residual value of the first component comprises inverse quantizing a signaled value of the first component, wherein the signaled value of the first component is signaled in the bitstream.

Clause 10C: The method of clause 6C, further comprising generating the point cloud data.

Clause 11C: A device includes a memory configured to store point cloud data; and one or more processors coupled to the memory and implemented in circuitry, the one or more processors configured to: obtain a bitstream that is encoded to comply with one or more constraints; and decode the bitstream, wherein the one or more processors are configured to, as part of decoding the bitstream: determine, based on data signaled in the bitstream, a residual value of a first component of an attribute of a point of the point cloud data; generate a predicted value of a second component of the attribute of the point; and reconstruct the second component as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 12C: The device of clause 11C, wherein the point is a first point of the point cloud data, the predefined bitdepths are first bitdepths, and the one or more processors are configured to, as part decoding the bitstream: determine, based on the data signaled in the bitstream, a residual value of a primary component of an attribute of a second point of the point cloud data; determine, based on the data signaled in the bitstream, a residual value of a secondary component of the attribute of the second point of the point cloud data; generate a predicted value of the secondary component of the attribute of the second point; and reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 13C: The device of clause 11C, wherein the one or more processors are further configured to clip the residual value of the first component to one of the predefined bitdepths.

Clause 14C: The device of clause 11C, wherein the one or more processors are further configured to determine, based on compliance of the bitstream with the one or more constraints, whether to decode the point cloud data.

Clause 15C: The device of clause 11C, wherein the one or more processors are configured to, as part of determining the residual value of the first component, inverse quantize a signaled value of the first component, wherein the signaled value of the first component is signaled in the bitstream.

Clause 16C: A device includes a memory configured to store point cloud data; and one or more processors coupled to the memory and implemented in circuitry, the one or more processors configured to encode the point cloud data, wherein the one or more processors are configured to, as part of encoding the point cloud data, generate a bitstream that complies with one or more constraints, wherein the one or more processors are configured to, as part of generating the bitstream: determine a residual value of a first component of an attribute of a point; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 17C: The device of clause 16C, wherein the point is a first point, the predefined bitdepths are first predefined bitdepths, and the one or more processors are configured to, as part of encoding the point cloud data: determine a residual value of a primary component of an attribute of a second point of the point cloud data; determine a residual value of a secondary component of the attribute of the second point of the point cloud data; generate a predicted value of the secondary component of the attribute of the second point; and reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

Clause 18C: The device of clause 16C, wherein the one or more processors are further configured to clip the residual value of the first component to one of the predefined bitdepths.

Clause 19C: The device of clause 16C, wherein the one or more processors are configured to, as part of determining the residual value of the first component, inverse quantize a signaled value of the first component, wherein the signaled value of the first component is signaled in the bitstream.

Clause 20C: The device of clause 16, further comprising a sensor to generate the point cloud data.

Clause 21C: A device includes means for obtaining a bitstream that is encoded to comply with one or more constraints; and means for decoding the bitstream, wherein the means for decoding the bitstream comprises: means for determining, based on data signaled in the bitstream, a residual value of a first component of an attribute of a point of point cloud data; means for generating a predicted value of a second component of the attribute of the point; and means for reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 22C: A device includes means for obtaining point cloud data; and means for encoding the point cloud data, wherein the means for encoding the point cloud data comprises means for generating a bitstream that complies with one or more constraints, wherein the means for generating the bitstream comprises: means for determining a residual value of a first component of an attribute of a point; means for generating a predicted value of a second component of the attribute of the point; and means for reconstructing the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 23C: A non-transitory computer-readable data storage medium having stored thereon instructions that, when executed, cause one or more processors to: obtain a bitstream that is encoded to comply with one or more constraints; and decode the bitstream, wherein the instructions that cause the one or more processors to decode the bitstream comprise instructions that, when executed, cause the one or more processors to: determine, based on data signaled in the bitstream, a residual value of a first component of an attribute of a point of point cloud data; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

Clause 24C: A non-transitory computer-readable data storage medium having stored thereon instructions that, when executed, cause one or more processors to: obtain point cloud data; and encode the point cloud data, wherein the instructions that cause the one or more processors to encode the point cloud data comprises instructions that, when executed, cause the one or more processors to generate a bitstream that complies with one or more constraints, wherein the instructions that cause the one or more processors to generate the bitstream comprise instructions that, when executed, cause the one or more processors to: determine a residual value of a first component of an attribute of a point; generate a predicted value of a second component of the attribute of the point; and reconstruct the second component of the attribute of the point as a sum of the predicted value of the second component of the attribute of the point and a multiplication product of a scale factor for the second component of the attribute of the point and the residual value of the first component of the attribute of the point, wherein the one or more constraints include a constraint that limits the first component of the attribute of the point, the residual value of the first component of the attribute of the point, the second component of the attribute, and the residual value of the second component of the attribute of the point to one or more predefined bitdepths.

This disclosure describes one or more examples that may be applied independently or in a combined way. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:
   obtaining a bitstream that was encoded to comply with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths; and
   decoding the bitstream, wherein decoding the bitstream comprises:
      determining, based on data signaled in the bitstream, a residual value of a first component of an attribute of a point, of the point cloud data;
      clipping the residual value of the first component of the attribute of the point to one of the one or more predefined bitdepths;
      generating a predicted value of a second component of the attribute of the point;
      reconstructing the second component as a sum of the predicted value of the second component of the attribute of the point and a multiplication product of a scale factor for the second component of the attribute of the point and the clipped residual value of the first component of the attribute of the point.

2. The method of claim 1, wherein the point is a first point of the point cloud data, the predefined bitdepths are first bitdepths, and decoding the bitstream further comprises:
   determining, based on the data signaled in the bitstream, a residual value of a primary component of an attribute of a second point of the point cloud data;
   determining, based on the data signaled in the bitstream, a residual value of a secondary component of the attribute of the second point of the point cloud data;
   generating a predicted value of the secondary component of the attribute of the second point; and
   reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

3. The method of claim 1, wherein the method further comprises determining, based on compliance of the bitstream with the one or more constraints, whether to decode the point cloud data.

4. The method of claim 1, wherein determining the residual value of the first component of the point comprises inverse quantizing a signaled value of the first component, wherein the signaled value of the first component is signaled in the bitstream.

5. A method of encoding point cloud data, the method comprising:
obtaining the point cloud data; and
encoding the point cloud data, wherein encoding the point cloud data comprises generating a bitstream that complies with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths, wherein generating the bitstream comprises:
determining a residual value of a first component of an attribute of a point;
clipping the residual value of the first component to one of the one or more predefined bitdepths;
generating a predicted value of a second component of the attribute of the point; and
reconstructing the second component of the attribute of the point as a sum of the predicted value of the second component of the attribute of the point and a multiplication product of a scale factor for the second component of the attribute of the point and the clipped residual value of the first component of the attribute of the point.

6. The method of claim 5, wherein the point is a first point, the predefined bitdepths are first predefined bitdepths, and encoding the point cloud data further comprises:
determining a residual value of a primary component of an attribute of a second point of the point cloud data;
determining a residual value of a secondary component of the attribute of the second point of the point cloud data;
generating a predicted value of the secondary component of the attribute of the second point; and
reconstructing the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

7. The method of claim 5, wherein determining the residual value of the first component comprises inverse quantizing a signaled value of the first component, wherein the signaled value of the first component is signaled in the bitstream.

8. A device comprising:
a memory configured to store point cloud data; and
one or more processors coupled to the memory and implemented in circuitry, the one or more processors configured to:
obtain a bitstream that was encoded to comply with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths; and
decode the bitstream, wherein the one or more processors are configured to, as part of decoding the bitstream:
determine, based on data signaled in the bitstream, a residual value of a first component of an attribute of a point of the point cloud data;
clip the residual value of the first component to one of the one or more predefined bitdepths;
generate a predicted value of a second component of the attribute of the point; and
reconstruct the second component as a sum of the predicted value of the second component of the attribute of the point and a multiplication product of a scale factor for the second component of the attribute of the point and the clipped residual value of the first component of the attribute of the point.

9. The device of claim 8, wherein the point is a first point of the point cloud data, the predefined bitdepths are first bitdepths, and the one or more processors are configured to, as part decoding the bitstream:
determine, based on the data signaled in the bitstream, a residual value of a primary component of an attribute of a second point of the point cloud data;
determine, based on the data signaled in the bitstream, a residual value of a secondary component of the attribute of the second point of the point cloud data;
generate a predicted value of the secondary component of the attribute of the second point; and
reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point, wherein the one or more constraints include a constraint that limits the secondary component of the attribute of the second point, the residual value of the secondary component of the attribute of the second point, and the residual value of the primary component of the attribute of the second point to one or more second predefined bitdepths.

10. The device of claim 8, wherein the one or more processors are further configured to determine, based on compliance of the bitstream with the one or more constraints, whether to decode the point cloud data.

11. The device of claim 8, wherein the one or more processors are configured to, as part of determining the residual value of the first component, inverse quantize a signaled value of the first component, wherein the signaled value of the first component is signaled in the bitstream.

12. A device comprising:
a memory configured to store point cloud data; and
one or more processors coupled to the memory and implemented in circuitry, the one or more processors configured to encode the point cloud data, wherein the one or more processors are configured to, as part of encoding the point cloud data, generate a bitstream that complies with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths, wherein the one or more processors are configured, to, as part of generating the bitstream:
determine a residual value of a first component of an attribute of a point;
clip the residual value of the first component to one of the one or more predefined bitdepths;
generate a predicted value of a second component of the attribute of the point; and
reconstruct the second component of the attribute of the point as a sum of the predicted value of the second component of the attribute of the point and a multiplication product of a scale factor for the second component of the attribute of the point and the clipped residual value of the first component of the attribute of the point.

13. The device of claim 12, wherein the point is a first point, the predefined bitdepths are first predefined bitdepths, and the one or more processors are configured to, as part of encoding the point cloud data:
determine a residual value of a primary component of an attribute of a second point of the point cloud data;
determine a residual value of a secondary component of the attribute of the second point of the point cloud data;
generate a predicted value of the secondary component of the attribute of the second point; and
reconstruct the secondary component of the attribute of the second point as a sum of the residual value of the secondary component of the attribute of the second point, the predicted value of the secondary component of the attribute of the second point, and a multiplication product of a scale factor for the secondary component of the attribute of the second point and the residual value of the primary component of the attribute of the second point,
wherein the one or more constraints include a constraint that limits the secondary component of the attribute of the second point, the residual value of the secondary component of the attribute of the second point, and the residual value of the primary component of the attribute of the second point to one or more second predefined bitdepths.

14. The device of claim 12, wherein the one or more processors are configured to, as part of determining the residual value of the first component, inverse quantize a signaled value of the first component, wherein the signaled value of the first component is signaled in the bitstream.

15. The device of claim 12, further comprising a sensor to generate the point cloud data.

16. A device comprising:
means for obtaining a bitstream that was encoded to comply with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths; and
means for decoding the bitstream, wherein the means for decoding the bitstream comprises:
means for determining, based on data signaled in the bitstream, a residual value of a first component of an attribute of a point of point cloud data;
means for clipping the residual value of the first component of the attribute of the point to one of the one or more predefined bitdepths;
means for generating a predicted value of a second component of the attribute of the point; and
means for reconstructing the second component of the attribute of the point as a sum of the predicted value of the second component of the attribute of the point and a multiplication product of a scale factor for the second component of the attribute of the point and the residual value of the first component of the attribute of the point.

17. A device comprising:
means for obtaining point cloud data; and
means for encoding the point cloud data, wherein the means for encoding the point cloud data comprises means for generating a bitstream that complies with one or more constraints, wherein the one or more constraints include a constraint that limits the first component of the attribute of the point the residual value of the first component of the attribute of the point, the second component of the attribute, and the residual value of the second component of the attribute of the point to one or more predefined bitdepths, wherein the means for generating the bitstream comprises:
means for determining a residual value of a first component of an attribute of a point;
means for clipping the residual value of the first component to one of the one or more predefined bitdepths;
means for generating a predicted value of a second component of the attribute of the point; and
means for reconstructing the second component of the attribute of the point as a sum of the predicted value of the second component of the attribute of the point and a multiplication product of a scale factor for the second component of the attribute of the point and the means for clipping the residual value of the first component of the attribute of the point.

18. A non-transitory computer-readable data storage medium having stored thereon instructions that, when executed, cause one or more processors to:
obtain a bitstream that was encoded to comply with one or more constraints,
wherein the one or more constraints include a constraint that limits the first component of the attribute of the point, the residual value of the first component of the attribute of the point, the second component of the attribute, and the residual value of the second component of the attribute of the point to one or more predefined bitdepths; and decode the bitstream, wherein the instructions that cause the one or more processors to decode the bitstream comprise instructions that, when executed, cause the one or more processors to:

determine, based on data signaled in the bitstream, a residual value of a first component of an attribute of a point of point cloud data;

clip the residual value of the first component to one of the one or more predefined bitdepths;

generate a predicted value of a second component of the attribute of the point; and reconstruct the second component of the attribute of the point as a sum of the predicted value of the second component of the attribute of the point and a multiplication product of a scale factor for the second component of the attribute of the point and the clipped residual value of the first component of the attribute of the point.

19. A non-transitory computer-readable data storage medium having stored thereon instructions that, when executed, cause one or more processors to:

obtain point cloud data; and encode the point cloud data, wherein the instructions that cause the one or more processors to encode the point cloud data comprises instructions that, when executed, cause the one or more processors to generate a bitstream that complies with one or more constraints, wherein the one or more constraints include a constraint that limits the first component of the attribute of the point, the residual value of the first component of the attribute of the point, the second component of the attribute, and the residual value of the second component of the attribute of the point to one or more predefined bitdepths, wherein the instructions that cause the one or more processors to generate the bitstream comprise instructions that, when executed, cause the one or more processors to:

determine a residual value of a first component of an attribute of a point;

clip the residual value of the first component to one of the one or more predefined bitdepths;

generate a predicted value of a second component of the attribute of the point; and reconstruct the second component of the attribute of the point as a sum of the predicted value of the second component of the attribute of the point and a multiplication product of a scale factor for the second component of the attribute of the point and the clipped residual value of the first component of the attribute of the point.

\* \* \* \* \*